(12) United States Patent
Sundrani et al.

(10) Patent No.: US 10,891,179 B2
(45) Date of Patent: Jan. 12, 2021

(54) DATA STORAGE DEVICE WITH DEADLOCK RECOVERY CAPABILITIES

(71) Applicant: Western Digital Technologies, Inc., San Jose, CA (US)

(72) Inventors: Kapil Sundrani, Bangalore (IN); Srinivasa Rao Paidi, Bangalore (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 162 days.

(21) Appl. No.: 16/167,254

(22) Filed: Oct. 22, 2018

(65) Prior Publication Data

US 2020/0125435 A1 Apr. 23, 2020

(51) Int. Cl.
| | | |
|---|---|---|
| G06F 11/00 | (2006.01) | |
| G06F 11/07 | (2006.01) | |
| G06F 11/14 | (2006.01) | |
| H04L 29/14 | (2006.01) | |
| H04L 29/08 | (2006.01) | |

(52) U.S. Cl.
CPC ...... G06F 11/0757 (2013.01); G06F 11/0793 (2013.01); G06F 11/141 (2013.01); G06F 11/1443 (2013.01); H04L 69/326 (2013.01); H04L 69/40 (2013.01); G06F 2201/81 (2013.01); G06F 2201/825 (2013.01)

(58) Field of Classification Search
CPC .................. G06F 11/0757; G06F 11/1443
See application file for complete search history.

(56) References Cited

U.S. PATENT DOCUMENTS

| | | | | |
|---|---|---|---|---|
| 7,162,667 B2* | 1/2007 | Brazdrum | ............... | H04L 29/06 714/55 |
| 7,965,625 B2* | 6/2011 | Yasuoka | ............... | H04L 69/326 370/218 |
| 9,665,456 B2* | 5/2017 | Nishiyama | .......... | G06F 13/4282 |
| 2006/0221840 A1* | 10/2006 | Yasuoka | ................... | H04L 1/20 370/242 |
| 2007/0088860 A1* | 4/2007 | Chang | .................. | G06F 3/0611 710/15 |
| 2007/0271481 A1* | 11/2007 | Kawakami | .......... | G06F 11/0727 714/5.11 |
| 2009/0019505 A1* | 1/2009 | Gopalakrishnan | .... | H04L 1/1841 725/109 |
| 2009/0300403 A1* | 12/2009 | Little | .................. | G06F 11/0793 714/2 |
| 2011/0154134 A1* | 6/2011 | Kohada | ............... | G06F 11/1443 714/54 |
| 2011/0320706 A1* | 12/2011 | Nakajima | ........... | G06F 11/0727 711/114 |

(Continued)

*Primary Examiner* — Jonathan D Gibson
(74) *Attorney, Agent, or Firm* — Loza & Loza, LLP; Gabriel Fitch

(57) ABSTRACT

Aspects of the disclosure provide a data storage device that includes a non-volatile memory and a controller. The controller includes a memory and a processor. The processor is configured to determine whether there is a deadlock in a communication link between the data storage apparatus and a host; and transmit, when there is a deadlock in the communication link between the data storage apparatus and the host, a recovery command to the host to re-establish a link layer connection between the data storage apparatus and the host.

20 Claims, 16 Drawing Sheets

(56) References Cited

U.S. PATENT DOCUMENTS

| | | | | |
|---|---|---|---|---|
| 2012/0131159 A1* | 5/2012 | Nagpal | ............... | G06F 9/4818 |
| | | | | 709/223 |
| 2013/0007484 A1* | 1/2013 | Gobriel | ............... | G06F 1/3209 |
| | | | | 713/320 |
| 2014/0026001 A1* | 1/2014 | Lin | ............... | G06F 11/1443 |
| | | | | 714/47.1 |
| 2015/0363252 A1* | 12/2015 | Singh | ............... | G06F 11/0772 |
| | | | | 714/57 |
| 2015/0370683 A1* | 12/2015 | Nishiyama | ............... | G06F 11/3419 |
| | | | | 714/43 |
| 2019/0004851 A1* | 1/2019 | Doshi | ............... | G06F 9/3842 |
| 2019/0384528 A1* | 12/2019 | Grosz | ............... | G06F 3/0679 |

\* cited by examiner

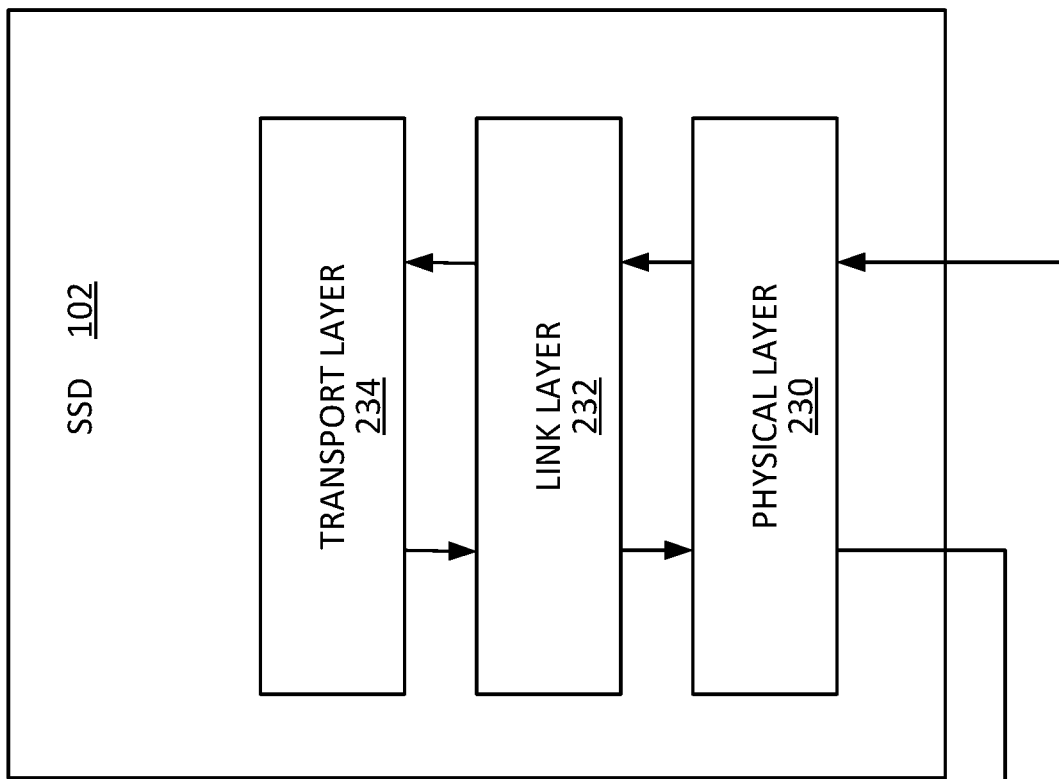
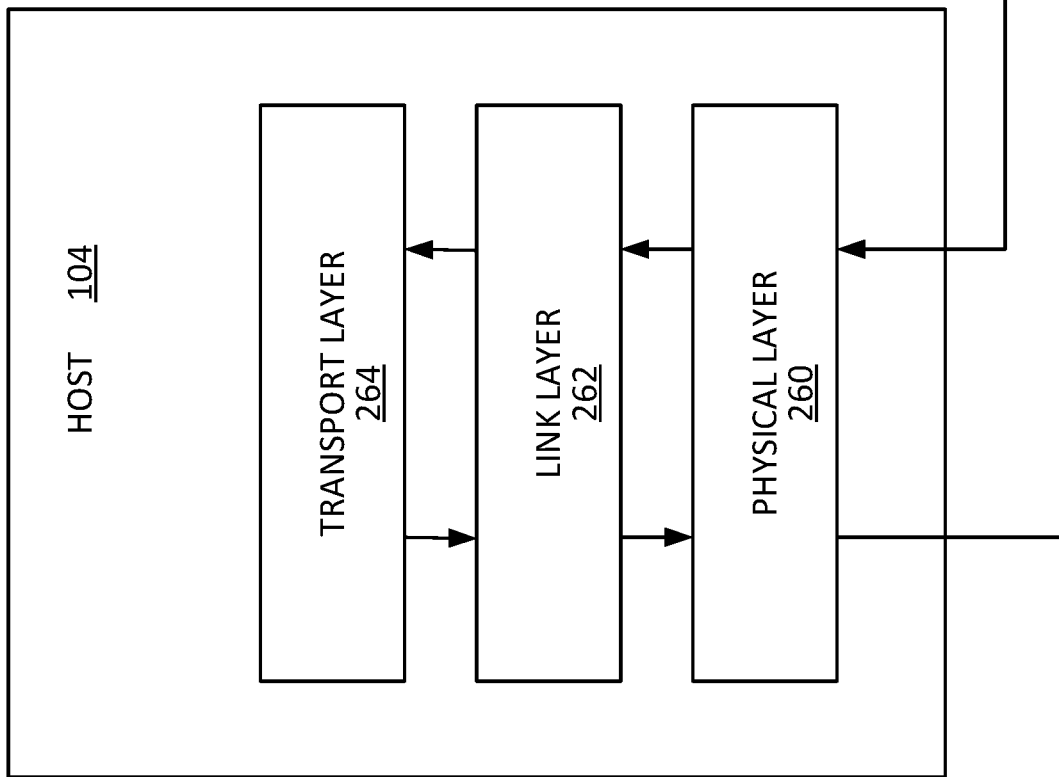
FIG. 2

DATA STORAGE DEVICE WITH DEADLOCK RECOVERY CAPABILITIES

FIELD

The present invention relates to data storage devices, and more particularly to a data storage device with deadlock recovery capabilities.

INTRODUCTION

Data storage devices are devices, such as drives, that can store a variety of data. Examples of data storage devices include a hard disk device (HDD) and a solid state device (SSD). In a variety of consumer electronics, solid state devices (SSDs) incorporating non-volatile memories (NVMs) are frequently replacing or supplementing conventional rotating HDDs for mass storage. These non-volatile memories may include one or more flash memory devices, such as NAND flash memories. These SSDs provide better performance than conventional rotating HDDs.

One or more of these data storage devices (e.g., SSDs) may be connected to a host, and communicate with the host through a communication link using a variety of communication protocols. The communication protocols allow the data storage device and the host to transmit and receive data. In some instances, a lock up can occur between the data storage device and the host where there is a communication link between the data storage device and the host, but no data is being transmitted and/or received. This is often referred as a deadlock, where the data storage device and/or the host is stuck in a state or loop, where commands and/or responses might be transmitted, but no data is transmitted and/or received by either or both the data storage device and the host. Often, the only solution to a deadlock is to reboot the host and/or the data storage device. However, rebooting the host and/or the data storage device is time consuming, can lead to loss of data, errors in data, and/or the re-transmission of data.

An improved data storage device is proposed that provides better performance by reducing the amount of time it takes to resolve deadlocks between a data storage device (e.g., SSD, HDD) and a host, while at the same time avoiding loss of data and/or errors in data between the data storage device and the host.

SUMMARY

According to an aspect, a data storage apparatus includes a non-volatile memory (NVM) and a controller coupled to the NVM. The controller includes a memory and a processor. The processor is configured to determine whether there is a deadlock in a communication link between the data storage apparatus and a host; and transmit, when there is a deadlock in the communication link between the data storage apparatus and the host, a recovery command to the host to re-establish a link layer connection between the data storage apparatus and the host.

According to another aspect, a method for operating a data storage apparatus is disclosed. The method determines whether there is a deadlock in a communication link between the data storage apparatus and a host. The method transmits, when there is a deadlock in the communication link between the data storage apparatus and the host, a recovery command to the host to re-establish a link layer connection between the data storage apparatus and the host, wherein the recovery command is constructed by a processor of the data storage apparatus using a transport layer of the communication link.

According to another aspect, an apparatus for operating a data storage device is disclosed. The apparatus includes means for non-volatile storing of data and means for controlling the means for non-volatile storing of data. The means for non-volatile storing of data includes means for storing data and means for processing data coupled to the means for storing data. The means for processing data is configured to use a timer to determine whether there is a deadlock at a link layer of a communication link between the data storage device and a host; and transmit to the host, when there is a deadlock in the communication link between the data storage device and the host, a recovery command to re-establish a link layer connection between the data storage device and the host.

According to another aspect, a device that includes a memory and a processor is disclosed. The processor is coupled to the memory. The processor is configured to determine whether a recovery command has been received through a communication link between a data storage apparatus and the device; and process the recovery command and transmit a response to the data storage apparatus, when the recovery command has been received. The processing of the recovery command re-establishes a link layer connection between the data storage apparatus and the device. The response that is transmitted is based on a command that was received from the data storage apparatus prior to receiving the recovery command.

BRIEF DESCRIPTION OF THE DRAWINGS

FIG. 2 illustrates a block diagram of various protocol layers for a host and a solid state device (SSD) in accordance with embodiments of the present disclosure.

DETAILED DESCRIPTION

The present disclosure provides a data storage device/apparatus. The data storage device/apparatus may include a hard disk device (HDD) and/or a solid state device (SSD). In one aspect, the SSD may be a solid state drive. A data storage apparatus, such as a SSD, may include a non-volatile memory (NVM) and a controller coupled to the NVM. The controller includes a memory and a processor. The processor is configured to determine whether there is a deadlock in a communication link between the data storage apparatus and a host; and transmit, when there is a deadlock in the communication link between the data storage apparatus and the host, a recovery command to the host to re-establish a link layer connection between the data storage apparatus and the host.

The present disclosure describes a solid state device (SSD) that includes deadlock recovery capabilities. However, it is noted that the deadlock recovery capabilities described in the present disclosure may be implemented in any type of data storage devices. For example, the deadlock recovery capabilities described in the present disclosure may be implemented in a HDD. Thus, a person of ordinary skill in the art will appreciate that the features, functions, capabilities, processes and/or methods of the present disclosure are applicable to all types of data storage devices, and are not limited to SSDs.

Figure 1:
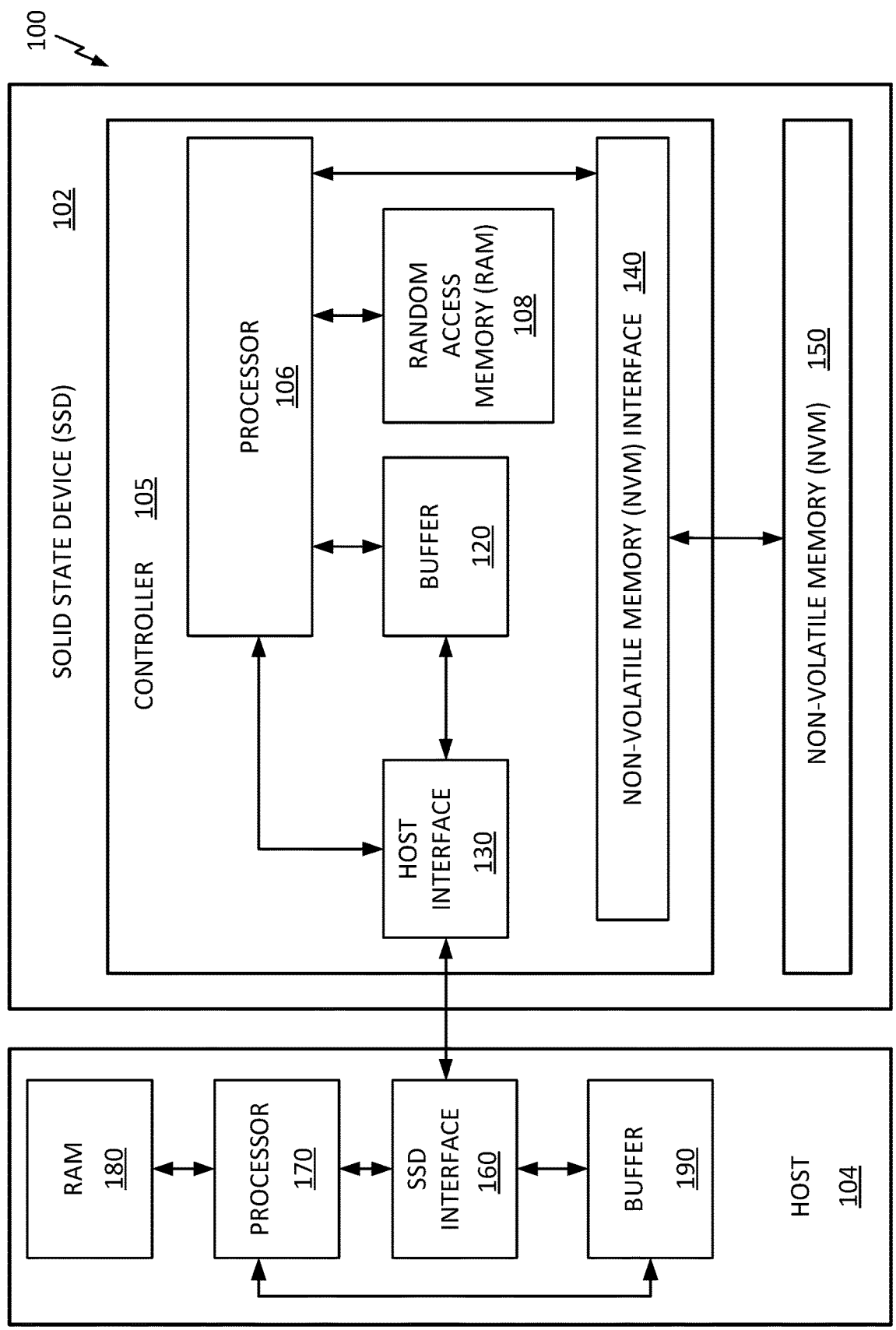
FIG. 1 illustrates a block diagram of a solid state device (SSD) with deadlock recovery capabilities in accordance with embodiments of the present disclosure.

FIG. 1 illustrates a block diagram of a device 100 that includes a solid state device (SSD) with deadlock recovery capabilities. The device 100 includes a solid state device (SSD) 102 and a host 104. The SSD 102 may be an example of a data storage apparatus. In some implementations, the SSD 102 may be implemented as a solid state drive. The SSD 102 is coupled to the host 104. One or more interconnects may provide physical input/output (I/O) data connections between the SSD 102 and the host 104. Interactions between the host 104 and NVM device 102 could be referred as protocol specific traffic over the host interface 130, which includes codes, primitives, instructions, commands, data, responses, confirmations and/or acknowledgements. In some implementations, the host 104 may also include deadlock recovery capabilities. Examples of deadlock recoveries are further described below. The host 104 may be a device that is separate from the SSD 102. In some implementations, the host 104 may be part of a device that includes the host 104 and the SSD 102.

The SSD 102 includes a controller 105 and a non-volatile memory (NVM) 150, such as NAND Flash memory. The controller 105 includes a processor 106 (or alternatively, an NVM processor 106), a random access memory (RAM) memory 108, a buffer 120 (e.g., SSD buffer), a host interface 130, and a non-volatile memory (NVM) interface 140. The controller 105 is configured to control the NVM 150. The controller 105 may be implemented in a System on Chip (SoC). The processor 106 may be a processor die, and the memory 108 may be a memory die. In some implementations, two or more of the above components (e.g., processor, memory) may be implemented as a single die.

The host interface 130 is coupled to the processor 106 and the buffer 120. The host interface 130 facilitates communication between the host 104 and other components of the SSD 102, such as the processor 106, the buffer 120 and/or the RAM 108. The host interface 130 may be any type of communication interface, such as an Integrated Drive Electronics (IDE) interface, a Universal Serial Bus (USB) interface, a Serial Peripheral (SP) interface, an Advanced Technology Attachment (ATA) or Serial Advanced Technology Attachment (SATA) interface, a Small Computer System Interface (SCSI), an IEEE 1394 (Firewire) interface, Non Volatile Memory Express (NVMe), or the like. The host interface 130 of the SSD 102 may be in communication with the SSD interface 160 of the host 104.

The processor 106 is coupled to the RAM memory 108 and the buffer 120. The processor 106 is also coupled to the NVM 150 via the NVM interface 140. The processor 106 controls operation of the SSD 102. In various aspects, the processor 106 receives commands from the host 104 through the host interface 130 and performs the commands to transfer data between the host 104 and the NVM 150. Furthermore, the processor 106 may manage reading from and writing to the memory 108 for performing the various functions effected by the processor 106 and to maintain and manage cached information stored in memory 108. The processor 106 may receive data through the buffer 120 and/or send data through the buffer 120.

The processor 106 may be configured to provide deadlock recovery capabilities. When the SSD 102 and/or the host 104 is in deadlock, the SSD 102 and/or the host 104 is stuck in a state or loop, where commands and/or responses may be transmitted, but the proper data or proper response is not transmitted and/or received by either or both the SSD 102 and the host 104. In some implementations, the processor 106 may detect a deadlock between the SSD 102 and the host 104, and the processor 106 may implement one or more commands to get the SSD 102 and/or the host 104 out of deadlock (e.g., out of a deadlock state, out of a deadlock loop), without having to reboot the SSD 102 and/or the host 104. In some implementations, the processor 106 may be implemented as an application specific integrated circuit (ASIC), and the deadlock can be resolved without having to re-spin the ASIC. More detailed examples of deadlock recovery will be further described below.

The processor 106 may include any type of processing device, such as a microprocessor, a microcontroller, an embedded controller, a logic circuit, software, firmware, or the like, for controlling operation of the SSD 102. In some aspects, some or all of the functions described herein as being performed by the processor 106 may instead be performed by another component of the SSD 102. For example, the SSD 102 may include a microprocessor, a microcontroller, an embedded controller, a logic circuit, software, firmware, or any kind of processing device, for performing one or more of the functions described herein as being performed by the processor 106. According to other aspects, one or more of the functions described herein as being performed by the processor 106 are instead performed by the host 104. In still further aspects, some or all of the functions described herein as being performed by the processor 106 may instead be performed by another component such as a processor in a hybrid drive including both non-volatile memory elements and magnetic storage elements.

The memory 108 may be any memory, computing device, or system capable of storing data. For example, the memory 108 may be a random-access memory (RAM), a dynamic random-access memory (DRAM), a double data rate (DDR) DRAM, a static random-access memory (SRAM), a synchronous dynamic random-access memory (SDRAM), a flash storage, an erasable programmable read-only-memory (EPROM), an electrically erasable programmable read-only-memory (EEPROM), or the like. In various embodiments, the processor 106 uses the memory 108, or a portion thereof, to store data during the transfer of data between the host 104 and the NVM 150. For example, the memory 108 or a portion of the memory 108 may be a cache memory. The memory 108 may be a shared memory that is accessible by different components, such the processor 106.

The buffer 120 (e.g., SSD buffer) may a memory or a region of a memory that is used to temporarily store data while the data is moved from one place to another. The buffer 120 may be a portion of the memory 108 or separate from the memory 108. The buffer 120 may include types of memory that are similar to the types of memory described above for the memory 108.

The NVM 150 receives data from the processor 106 via the NVM interface 140 and stores the data. The NVM 150 may be any type of non-volatile memory, such as a flash storage system, a NAND-type flash memory, a solid state storage device, a flash memory card, a secure digital (SD) card, a universal serial bus (USB) memory device, a CompactFlash card, a SmartMedia device, a flash storage array, or the like. In one aspect, where the NVM 150 includes a flash storage system, the NVM interface 140 may be a flash memory interface.

Different data storage devices may use different types of NVMs. For example, a data storage device or a data storage apparatus, such as a HDD, may include NVMs that are magnetic storage devices and/or use magnetic storage techniques to store the data.

The host 104 may be any device and/or system having a need for data storage or retrieval and a compatible interface for communicating with the SSD 102. For example, the host 104 may be a computing device, a personal computer, a portable computer, a workstation, a server, a router, a network device, a personal digital assistant, a digital camera, a digital phone, or combinations thereof. The host 104 can include several hosts. The host 104 may be a separate (e.g., physically separate) device from the SSD 102. In some embodiments, the host 104 includes the SSD 102. In other embodiments, the SSD 102 is remote with respect to the host 104 or is contained in a remote computing system communicatively coupled with the host 104. For example, the host 104 may communicate with the SSD 102 through a wireless communication link.

The host 104 may include an SSD interface 160, a processor 170, a random access memory (RAM) 180 (e.g., host RAM), and a buffer 190 (e.g., host buffer). The SSD interface 160 is coupled to the processor 170 and the buffer 190. The processor 170 is coupled to the RAM 180. As will be further described below, the host 104 may include deadlock recovery capabilities.

The SSD interface 160 facilitates communication between the SSD 102 and other components of the host 104, such as the processor 170, the RAM 180 and/or the buffer 190. The host 104 provides commands to the SSD 102 for transferring data between the host 104 and the SSD 102. For example, the host 104 may provide a write command to the SSD 102 for writing data to the SSD 102, or a read command to the SSD 102 for reading data from the SSD 102. The SSD 102 may provide a response, to the write command or the read command, to the host 104.

The processor 170 may be configured to provide deadlock recovery capabilities. The processor 170 may be similar to the processor 106. For example, the processor 170 may include any type of processing device, such as a microprocessor, a microcontroller, an embedded controller, a logic circuit, software, firmware, or the like, for controlling operation of the host 104. In some aspects, some or all of the functions described herein as being performed by the processor 170 may instead be performed by another component of the host 104. For example, the host 104 may include a microprocessor, a microcontroller, an embedded controller, a logic circuit, software, firmware, or any kind of processing device, for performing one or more of the functions described herein as being performed by the processor 170. According to other aspects, one or more of the functions described herein as being performed by the processor 170 are instead performed by the SSD 102. In still further aspects, some or all of the functions described herein as being performed by the processor 170 may instead be performed by another.

The memory 180 may be any memory, computing device, or system capable of storing data. For example, the memory 180 may be a random-access memory (RAM), a dynamic random-access memory (DRAM), a double data rate (DDR) DRAM, a static random-access memory (SRAM), a synchronous dynamic random-access memory (SDRAM), a flash storage, an erasable programmable read-only-memory (EPROM), an electrically erasable programmable read-only-memory (EEPROM), or the like. In various embodiments, the processor 170 uses the memory 180, or a portion thereof, to store data. For example, the memory 180 or a portion of the memory 180 may be a cache memory. The memory 180 may be a shared memory that is accessible by different components, such the processor 170.

The buffer 190 (e.g., host buffer) may a memory or a region of a memory that is used to temporarily store data while the data is moved from one place to another. The buffer 190 may be a portion of the memory 180 or separate from the memory 180. The buffer 190 may include types of memory that are similar to the types of memory described above for the memory 180.

FIG. 2 illustrates a block diagram of exemplary protocol layers between the SSD 102 and the host 104. The protocol layers allow the SSD 102 and the host 104 to communicate with each other. The SSD 102 may communicate with the host 104 through a physical layer 230, a link layer 232, and a transport layer 234. The physical layer 230, the link layer 232, and the transport layer 234 may be implemented in the host interface 130 of the SSD 102. The host 104 may communicate with the SSD 102 through a physical layer 260, a link layer 262, and a transport layer 264. The physical layer 260, the link layer 262, and the transport layer 264 may be implemented in the SSD interface 160 of the host 104.

The physical layers 230 and 260 specify the transmission and reception of raw bits of data over a physical connection or medium (e.g., wires, cable). The physical layers 230 and 260 may specify electrical and/or physical characteristics of the physical connection or medium that transports the raw bits.

The link layers 232 and 262 specify the transfer of data frames between nodes. The link layers 232 and 262 may specify the transfer of data structures including control information and/or payload data. An example of the data structure may include Frame Information Structure (FIS). The data structure may include a header and payload. The link layers 232 and 262 may also manage the flow of the data frames over the communication link. The link layers 232 and 262 may specify how the data frames are transported in such a way as to be error free.

The transport layers 234 and 264 specify how to act on the data frames (e.g., FIS) that are transported. The transport layers 234 and 264 may have the responsibility of acting on data frames in an appropriate order or sequence. The transport layers 234 and 264 may be ensure that there are no data frame losses and/or data frame duplications. The transport layers 234 and 264 may specify to construct the data frames and/or commands/response (e.g., VU recovery command).

The physical layers 230 and 260, the link layers 232 and 262, and the transport layers 234 and 264 are examples of protocol layers that allow the SSD 102 and the host 104 to communicate with each other. The host interface 130 may include other protocol layer(s). Similarly, the SSD interface 160 may include other protocol layer(s). Examples of other protocol layers include an application layer.

A deadlock may occur when there is stall on a communication link or communication channel between the SSD 102 and the host 104, due to the SSD 102 or host 104 state machines not working properly (e.g., stall over communication link due to the link layer 232 and 262 state machine lockup). A deadlock of the SSD 102 and/or the host 104 may originate from one of the above-mentioned protocol layers. In a deadlock, the communication between the SSD 102 and the host 104 may be in frozen and/or stalled state. For example, in a deadlock, there may be communication (e.g., transmission and reception of data frames, commands and responses) between the SSD 102 and the host 104, but there is no transmission and/or reception of data stored in the SSD 102 (e.g., data stored in the NVM 150) or data to be stored in the SSD 102 (e.g., data to be stored in the NVM 150). However, different deadlocks may cause the SSD 102 and/or the host 104 to operate differently. In another example, in a deadlock, the SSD 102 and/or the host 104 may provide a response to a command that is not proper, appropriate or expected from the command. In yet another example, in a deadlock, the SSD 102 and/or the host 104 may not be properly processing information at the link layer level, such as when the transport layer is not able to properly construct or decode data at the link layer level. More specific examples of deadlocks are further described below. In some implementations, the cause or reason of the above deadlocks may be the result of unexpected processing of information by the SSD 102 and/or the host 104.

When there is a deadlock, the SSD 102 and/or the host 104 may recover from the deadlock by introducing a unique command in the communication link between the SSD 102 and the host 104. The type of command that is introduced may depend on the source or reason of the deadlock. For example, the deadlock may be at the link layer level of the communication link. In such instances, the SSD 102 and/or the host 104 may transmit a command that knocks the communication link out of deadlock and regular communication between the SSD 102 and the host 104 can resume. The command that is introduced can be any instruction and/or data. In some implementations, the command may include a Vendor Unique (VU) command (e.g., VU FIS). More examples of recovering from a deadlock are described below.

Figure 3:
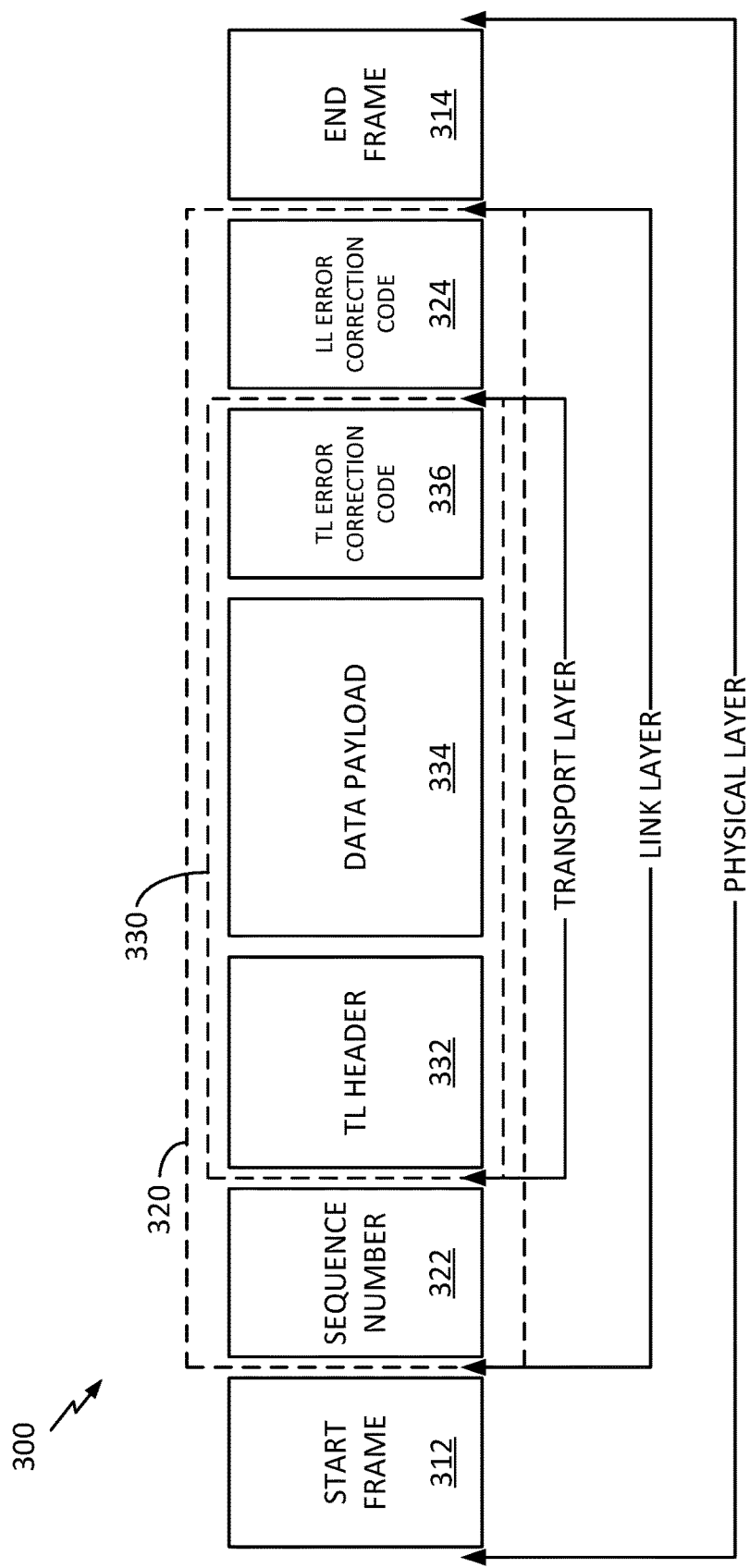
FIG. 3 illustrates a block diagram of data packet that can be transmitted between a host and a solid state device (SSD) in accordance with embodiments of the present disclosure.

FIG. 3 illustrates an exemplary data structure 300 that may be transmitted between the SSD 102 and the host 104 through a communication link. The data structure 300 includes a start frame 312, a physical layer packet 320, and an end frame 314. The start frame 312, the physical layer packet 320 and the end frame 314 may be considered part of a physical layer of communication link between the SSD 102 and the host 104. The physical layer packet 320 includes the sequence number 322, the link layer package 330, and a link layer error correction code 324. The sequence number 322, the link layer package 330, and the link layer error correction code 324 may be part of the link layer of the communication link between the SSD 102 and the host 104. The link layer error correction code 324 may include cyclic redundancy check (CRC). The link layer package 330 includes a transport layer header 332, a transport layer (TL) payload 334, and a TL error correction code 336. The transport layer header 332, the transport layer (TL) payload 334, and the TL error correction code 336 may be part of the transport layer of the communication link between the SSD 102 and the host 104.

In some implementations, a recover command to recover from a deadlock may include transmitting from the SSD 102 or the host 104, a data structure 300 that includes a VU command (e.g., VU FIS). The VU command may be included in the link layer package 330. In some implementations, any of the commands (e.g., recovery command) and/or responses described in the present disclosure may be implemented in the data structure 300, or any other types of data structures. It is noted that the data structure 300 is merely an example of a data structure. Other implementations may use other data structures that include other protocols layers mentioned in the present disclosure. Other implementations may use different arrangements of the data structures that include less or more protocol layers.

Figure 4:
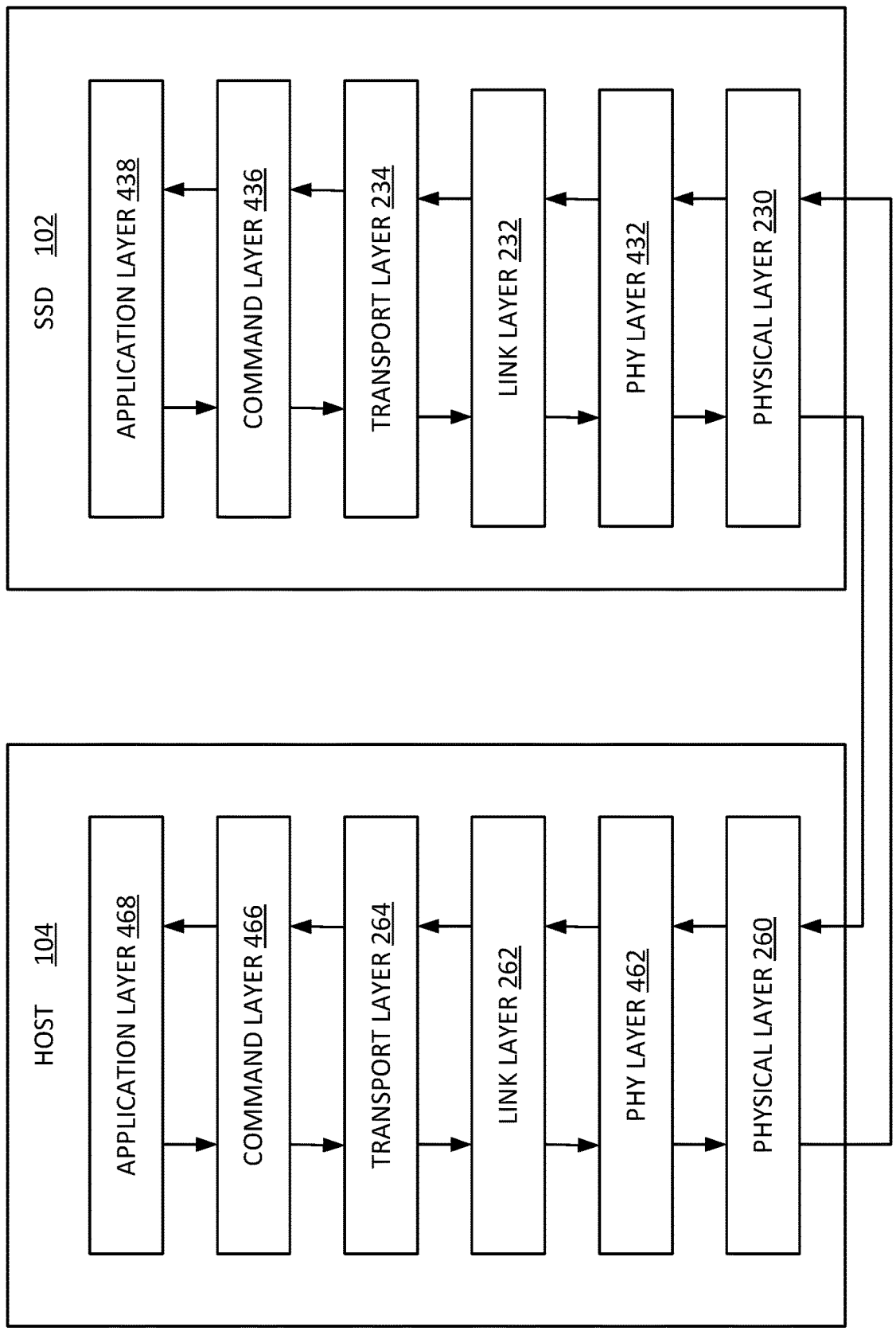
FIG. 4 illustrates a block diagram of various protocol layers for a host and a solid state device (SSD) in accordance with embodiments of the present disclosure.

FIG. 2 illustrates an example of protocol layers for communicating between the SSD 102 and the host 104. However, some implementations may use different protocol layers. FIG. 4 illustrates another example of protocol layers for communicating between the SSD 102 and the host 104. FIG. 4 illustrates that the SSD 102 may communicate with the host 104 through the physical layer 230, a PHY layer 432, the link layer 232, the transport layer 234, a command layer 436 and an application layer 438. In some implementations, some or all of the above protocol layers are implemented in the host interface 130.

FIG. 4 also illustrates that the host 104 may communicate with the SSD 102 through the physical layer 260, a PHY layer 462, the link layer 262, the transport layer 264, a command layer 466 and an application layer 468. In some implementations, some or all of the above protocol layers are implemented in the SSD interface 160.

In some implementations, the physical layers 230 and 260 may specify properties of the cables and connectors that link the SSD 102 and the host 104. The physical layers 230 and 260 may be responsible for detecting other devices on a communication link and/or link initialization. In some implementations, the PHY layers 432 and 462 may specify how to perform the transmission and reception of link layer traffic, link initiation and/or power management. In some implementations, the link layers 232 and 262 may specify how frames are transmitted and received, transmit primitives based on control signals from the transport layer, and receives primitives from the PHY layer that are converted to control signals for the transport layer. In some implementations, the transport layers 234 and 264 may specify how to construct the data, such as FIS, and requests for transmission of data (e.g., FIS), how to decode a data that has been received, how to detect errors in data, how to handle a data retry, and/or manage flow and/or sequence control. The transport layers 234 and 264 may have the responsibilities of acting on frames, handling the assembly and disassembly of data (e.g., FIS); creating, encoding, decoding data requested by a command layer; and/or removing data when frames are received. In some implementations, the command layers 436 and 466 specify which data (e.g., FIS) needs to be exchanged between the SSD 102 and the host 104 during a command execution. In some implementations, the application layers 438 and 468 specify the registers for the SSD 102 and the host 104. A deadlock may occur in one or more of the above protocol layers.

It should be noted that in some instances, when a particular protocol layer is performing an operation, as described in the present disclosure, it may mean that one or more processors may be performing or implementing the operation by using the particular protocol. For example, when a transport layer is performing an operation, that may mean that a processor may perform that operation by using the transport layer.

Having described various protocol layers, an example of how various protocol layers work together to deal with a deadlock, transmit and receive data will be further described below.

Figure 5:
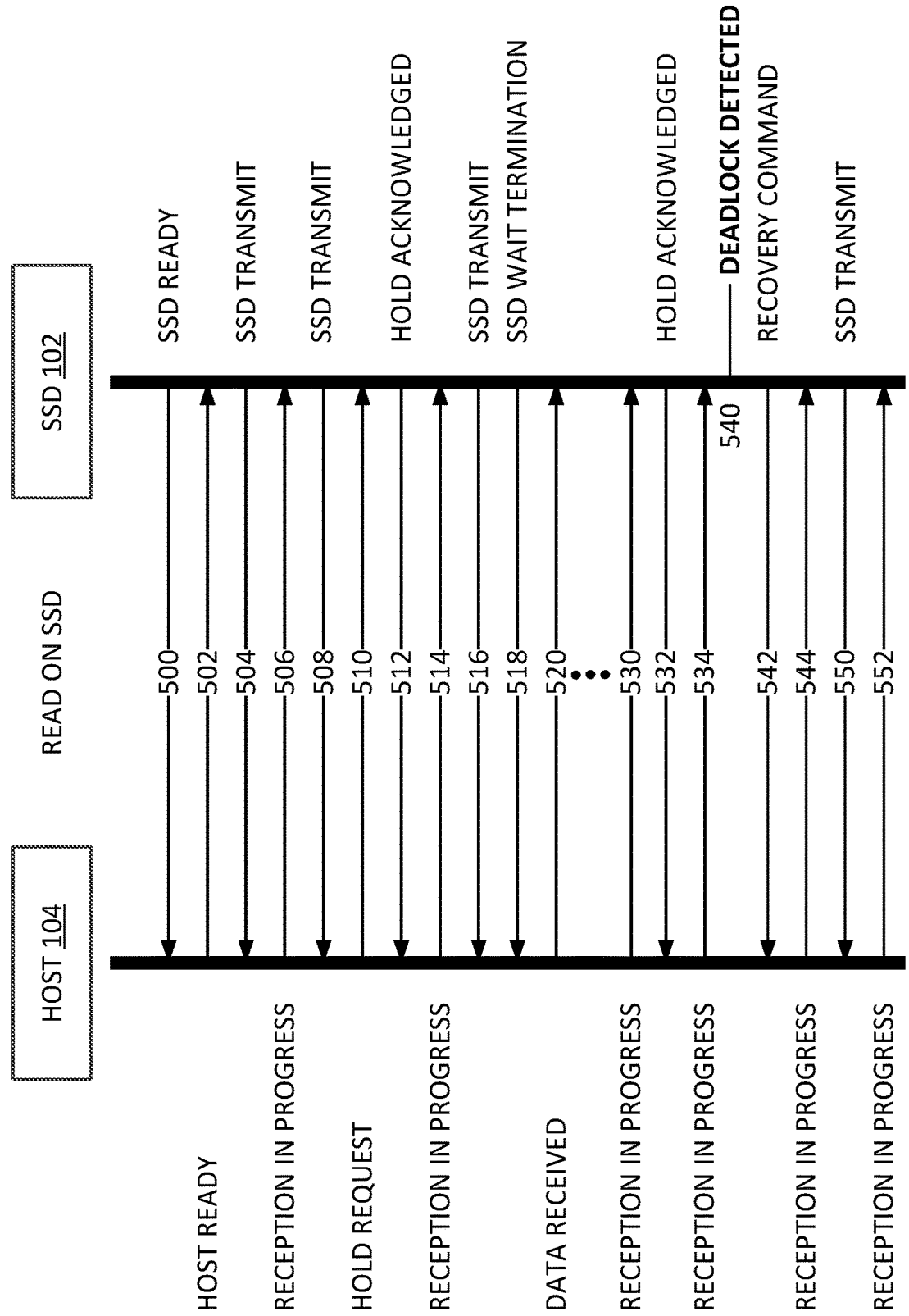
FIG. 5 illustrates an exemplary flow diagram of a method for resolving a deadlock by an SSD during a read operation.

Exemplary Flow Sequence of a Solid State Device (Ssd) Recovering from a Deadlock During a Read Operation on the Ssd FIG. 5 illustrates an exemplary flow sequence diagram for resolving or recovering from a deadlock by an SSD. The flow sequence of FIG. 5 may represent a sequence that includes a read operation request from the host 104, to the SSD 102. FIG. 5 will be described from the perspective of the SSD 102.

The SSD 102 may transmit a command 500 indicating that the SSD 102 is ready to transmit data (e.g., FIS) to the host 104. The SSD 102 may receive a command 502 from the host 104, in response to the command 500, indicating the host 104 is ready to receive data (e.g., FIS) from the SSD 102. The SSD 102 may transmit a first data (e.g., first FIS) 504 to the host 104, in response to the command 502. The SSD 102 may receive a response 506 that the first data 504 is in progress of being received. The SSD 102 may transmit a second data (e.g., second FIS) 508 to the host 104. The SSD 102 may receive a response 510 to hold off any further transmission of data. The SSD 102 may transmit a response 512 acknowledging the hold request. The SSD 102 may receive a command 514 to resume transmitting data. The SSD 102 may transmit a third data (e.g., third FIS) 516 to the host 104, in response to the response 512. The SSD 102 may transmit a command 518 indicating that a first frame (which may include the first data, the second data and the third data) has been transmitted and is waiting for frame termination confirmation. The SSD 102 may receive a response 520 indicating that the frame (e.g., first data, second data and/or third data) has been received by the host 104. In some implementations, the above sequence may be repeated several times for each respective frame that is transmitted. However, the sequence of the commands and responses may vary frame by frame. For example, there might be variations in the number of commands and number of responses for different frames.

FIG. 5 further illustrates the SSD 102 receives code 530 to resume transmission of data (e.g., FIS). The SSD 102 may send a command 532 acknowledging a hold request. The SSD 102 receives a command 534 to resume transmission of data. The SSD 102 detects (at 540) that a deadlock has occurred. There are various ways for the SSD 102 to detect or determine that a deadlock has occurred and/or is in progress. In one example, the SSD 102 may use a timer or clock (e.g., countdown clock) to keep track of when the last time data has been transmitted and/or received by the SSD 102. The timer or clock may reset every time data has been transmitted and/or received (e.g., successfully transmitted and/or received). Whenever the timer is equal or above a certain value, the SSD 102 may determine that a deadlock has occurred between the SSD 102 and the host 104. In some implementations, the timer is a countdown clock, and a deadlock is determined to have occurred (e.g., since the last deadlock) or is in progress when the clock reaches zero or any other threshold value. Another way to determine whether a deadlock has occurred may be to look at how full the buffer 120 is. When the buffer 120 is full, near capacity and/or equal or above a certain threshold value, the SSD 102 may make a determination that a deadlock has occurred, since a buffer 120 that is not clearing may mean that data in the buffer is not being transmitted. The determination of the deadlock may be made by the processor 106 of the SSD 102. In some implementations, the processor 106 may keep track of the timer or clock, and/or the capacity of the buffer 120.

In some implementations, determining that a deadlock has occurred may be enough for the SSD 102 to recover from the deadlock. In some instances, the deadlock between the SSD 102 and the host 104 may originate at the link layer of the communication link. In some implementations, transmitting a recovery command 542 to the host 104 may get the SSD 102 out of deadlock. The recovery command 542 may include a unique command to let the host 104 know that a deadlock has occurred. In some implementations, the recovery command 542 is enough to get the communication link between the SSD 102 and the host 104 out of deadlock state or deadlock loop. Different implementations may use different variations of the recovery command 542. The recovery command 542 may include data, commands, and/or responses. In some implementations, the recovery command 542 may include a FIS (e.g., VU FIS).

In some implementations, when the host 104 receives the recovery command 542, the host 104 may recover from the deadlock. In some implementations, when the host 104 receives the recovery command 542 (e.g., FIS), the host 104 may simply drop the recovery command 542 without triggering any recovery action, as the host 104 understands that the recovery command 542 that has been send by the SSD 102 to try to get out of the deadlock. The SSD 102 may receive a command 544 to resume transmission of data, after transmitting the recovery command 542. The SSD 102 may transmit data 550 to the host 104. The SSD 102 may receive a response 552 that the data 550 is in progress of being received. The SSD 102 may continue to transmit and receive codes, commands, responses and/or data as described above for FIG. 5. Primitives and frames are examples of code, commands, responses that may be transmitted between the SSD 102 and the host 104.

Figure 6:
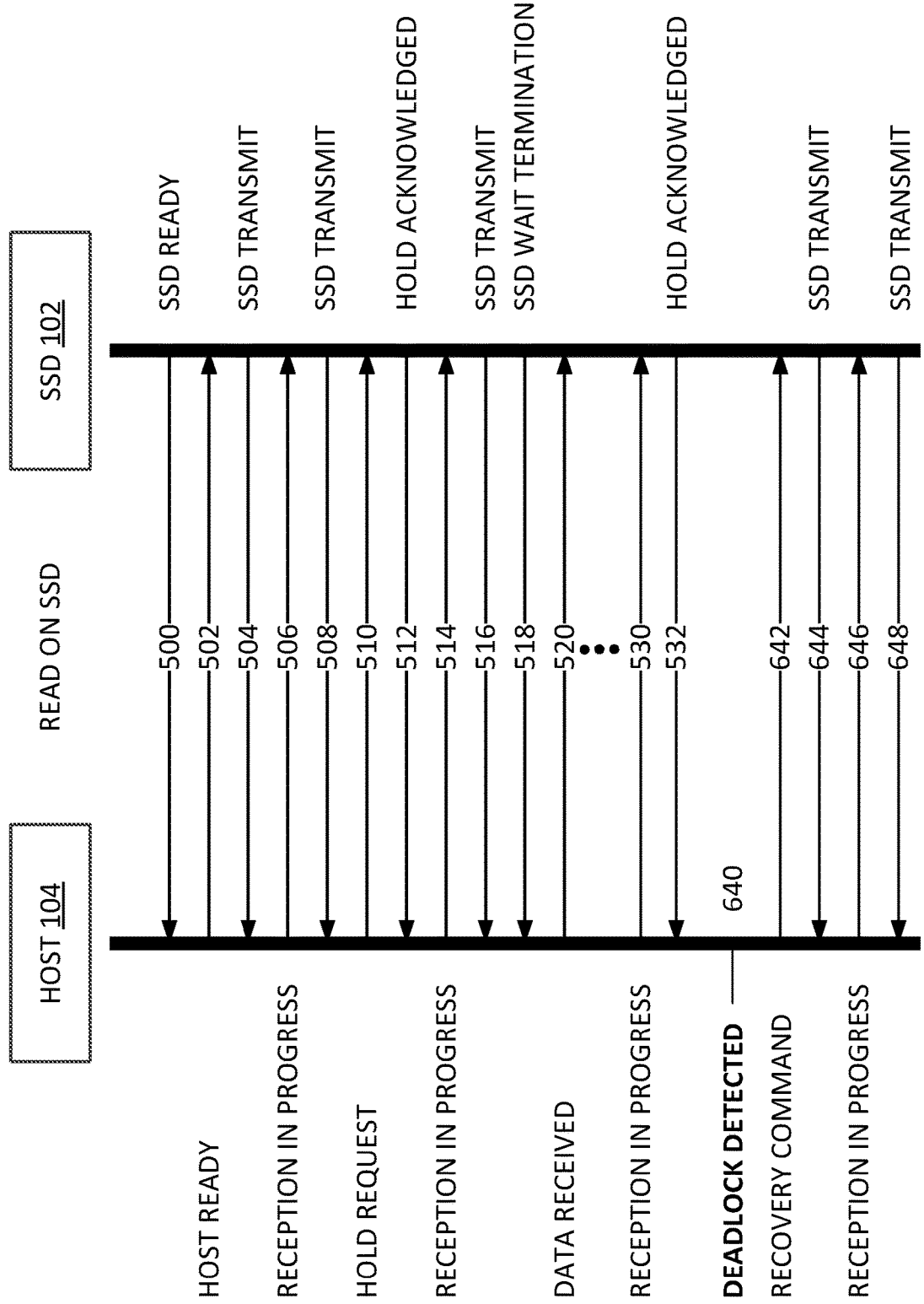
FIG. 6 illustrates an exemplary flow diagram of a method for resolving a deadlock by a host during a read operation.

FIG. 6 illustrates an exemplary flow sequence diagram for resolving or recovering from a deadlock by a host. The flow sequence of FIG. 6 may represent a sequence that includes a read operation request from the host 104, to the SSD 102. FIG. 6 will be described from the perspective of the host 104. FIG. 6 is similar to FIG. 5, but shows that the deadlock detection is made by the host 104. The commands and responses 500 through 520 of FIG. 6 are similar to the commands and responses 500 through 520 of FIG. 5.

FIG. 6 illustrates the host 104 transmits code 530 to resume transmission of data (e.g., FIS). The host 104 may receive the command 532 acknowledging a hold request, which may not be the proper response by the SSD 102. The host 104 detects (at 640) that a deadlock has occurred. There are various ways for the host 104 to detect or determine that a deadlock has occurred and/or is in progress. In one example, the host 104 may use a timer or clock (e., countdown clock) to keep track of when the last time data has been transmitted and/or received by the host 104. The timer or clock resets every time data has been transmitted and/or received (e.g., successfully transmitted and/or received). Whenever the timer is equal or above a certain value, the host 104 determines that a deadlock has occurred between the SSD 102 and the host 104. In some implementations, the timer is a countdown clock, and a deadlock is determined to have occurred or is in progress when the clock reaches zero or some other threshold value. Another way to determine whether a deadlock has occurred may be to look at how full the buffer 190 is. When the buffer 190 is full, near capacity and/or equal or above a certain threshold value, the host 104 may make a determination that a deadlock has occurred, since a buffer 190 that is not clearing may mean that data in the buffer is not being transmitted. The determination of the deadlock may be made by the processor 170 of the host 104. In some implementations, the processor 170 may keep track of the timer or clock, and/or the capacity of the buffer 190.

In some implementations, determining that a deadlock has occurred may be enough for the host 104 to recover from the deadlock. In some instances, the deadlock between the SSD 102 and the host 104 may originate at the link layer of the communication link. In some implementations, transmitting a recovery command 642 to the SSD 102 may get the host 104 out of deadlock. The recovery command 642 includes a unique command to let the SSD 102 know that a deadlock has occurred. In some implementations, the recovery command 642 is enough to get the communication link between the SSD 102 and the host 104 out of deadlock state or deadlock loop. Different implementations may use different variations of the recovery command 642. The recovery command 642 may include data, commands, and/or responses. In some implementations, the recovery command 642 may include a FIS (e.g., VU FIS).

In some implementations, when the host 104 transmits the recovery command 642 and the SSD 102 receives the recovery command 642, the SSD 102 may recover from the deadlock. The host 104 may receive data 644 from the SSD 102. The host 104 may transmit a response 646 that the data 644 is in progress of being received. The host 104 may receive data 648 from the SSD 102.

Figure 7:
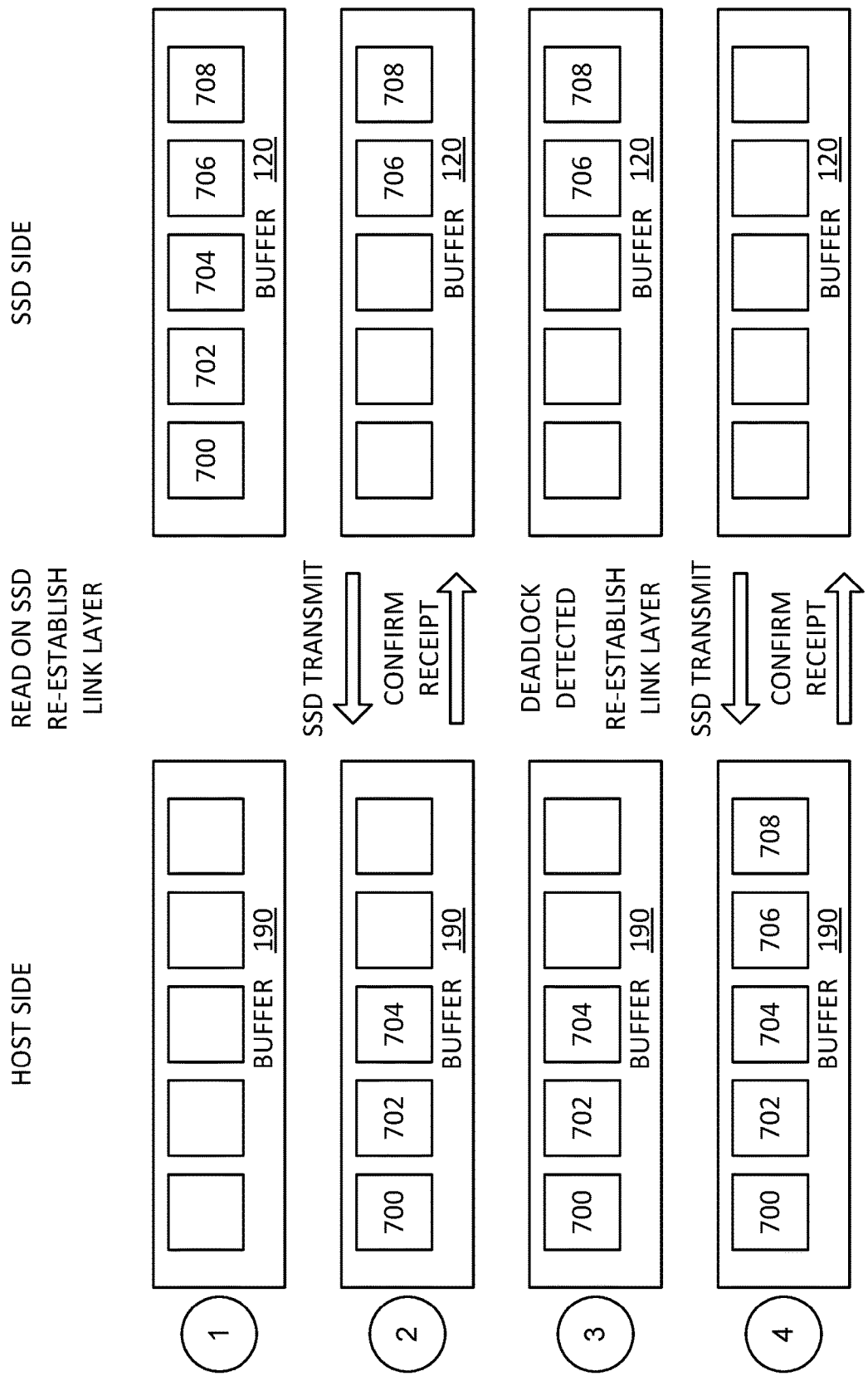
FIG. 7 illustrates an exemplary flow diagram of a sequence for resolving a deadlock by a SSD during a read operation.

FIG. 7 illustrates an exemplary flow sequence diagram for resolving or recovering from a deadlock. The flow sequence of FIG. 7 may represent a sequence that includes a read operation request from the host 104, to the SSD 102.

State 1 of FIG. 7 illustrates a state where the buffer 190 of the host 104 is empty and the buffer 120 of the SSD 102 includes a first data 700, a second data 702, a third data 704, a fourth data 706 and a fifth data 708.

State 2 of FIG. 7 illustrates a state after the first data 700, the second data 702 and the third data 704 from the SSD 102 have been transmitted to the host 104. The first data 700, the second data 702 and the third data 704 are now stored in the buffer 190 of the host 104. It is noted that in some implementations, the first data 700, the second data 702 and the third data 704 may bypass the buffer 190 and be transmitted to the processor of the host 104. Once the host 104 has confirmed that the first data 700, the second data 702 and the third data 704 have been received by the host 104, the first data 700, the second data 702 and the third data 704 stored in the buffer 120 of the SSD 102 may be deleted from the buffer 120 or the address storing the first data 700, the second data 702 and the third data 704 may be freed up to store other data. In this case, state 2 illustrates that the first data 700, the second data 702 and the third data 704 have been deleted.

State 3 of FIG. 7 illustrates a state after a deadlock has been detected between the SSD 102 and the host 104. The deadlock can be detected by either the SSD 102 or the host 104, as described above in FIGS. 5 and 6. A recovery command (e.g., 542, 642) has been transmitted (by either the SSD 102 or the host 104). State 3 illustrates that data that has not been transmitted to the host 104 is still present in the buffer 120 and has not been lost. In some implementations, additional data may be stored in the buffer 120 while there is deadlock and/or while recovering from deadlock. On the host 104 side, state 3 illustrates that the first data 700, the second data 702 and the third data 704 are still in the buffer 190 while in deadlock and/or recovering from deadlock. However, in some implementations, the first data 700, the second data 702 and the third data 704 may be freed up from the buffer 190 as the processor of the host 104 processes the first data 700, the second data 702 and the third data 704, even while the host 104 is in deadlock or recovering from deadlock.

State 4 of FIG. 7 illustrates a state after the fourth data 706 and the fifth data 708 from the SSD 102 have been transmitted to the host 104. Once the host 104 has confirmed that the fourth data 706 and the fifth data 708 have been received by the host 104, the fourth data 706 and the fifth data 708 stored in the buffer 120 of the SSD 102 may be deleted from the buffer 120 or the address storing the fourth data 706 and the fifth data 708 may be freed up to store other data.

The above approach for deadlock recovery provides a solution that preserves data that is already stored in the buffer, which reduces latency (for not having to reload data in the buffer) and reduces errors in the data that is transmitted. In contrast, a hard reset of the SSD 102 does not preserve data in the buffer and has a very high impact on the command latency. In addition, a hard reset may also result in current commands and/or active commands to be lost.

Figure 8:
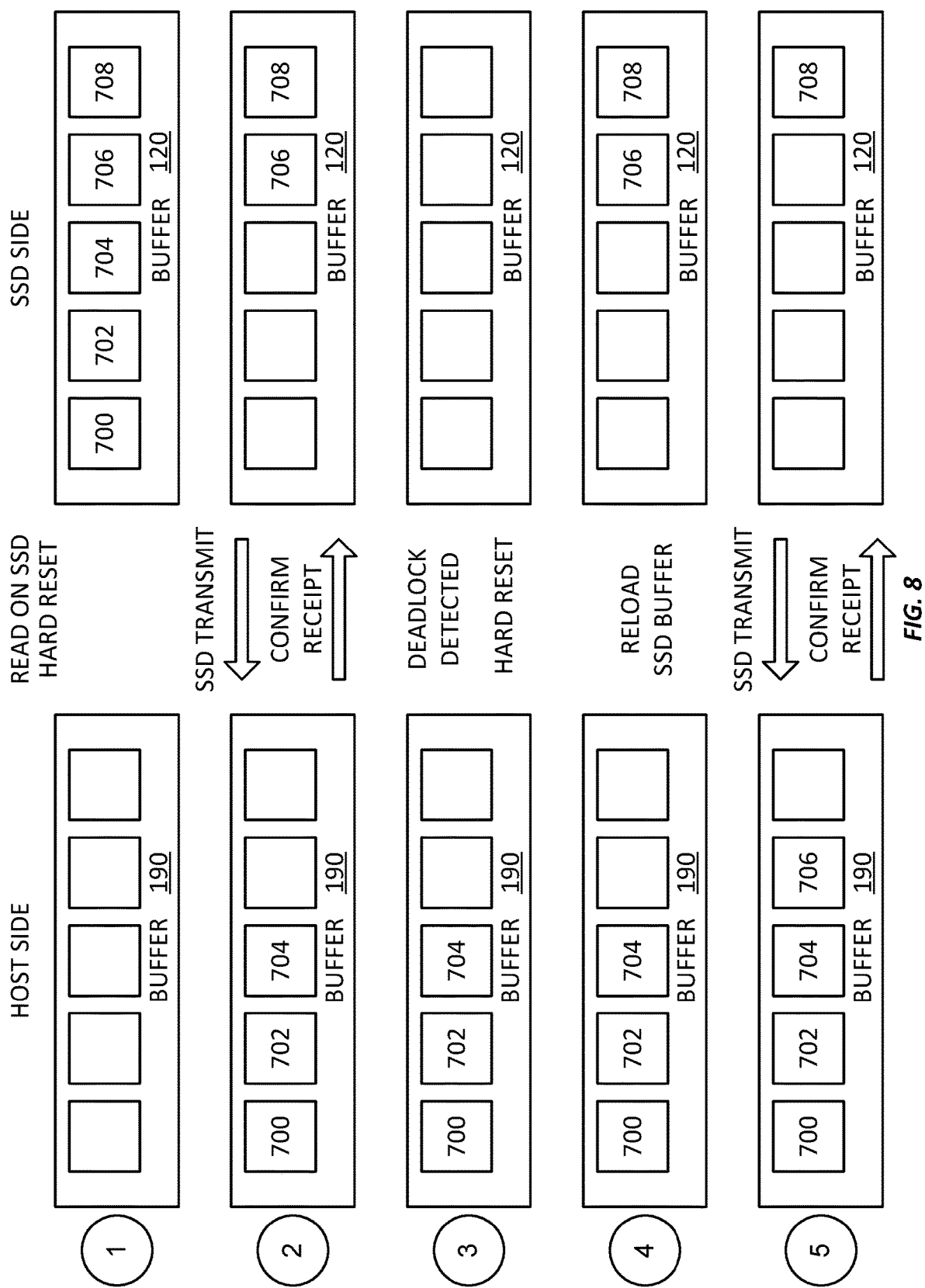
FIG. 8 illustrates an exemplary flow diagram of a sequence for resolving a deadlock by a host during a read operation.

FIG. 8 illustrates an exemplary flow sequence diagram for resolving or recovering from a deadlock. The flow sequence of FIG. 8 may represent a sequence that includes a read operation request from the host 104, to the SSD 102. FIG. 8 illustrates a process that recovers from deadlock and also clear the buffer of the SSD 102.

State 1 of FIG. 8 illustrates a state where the buffer 190 of the host 104 is empty and the buffer 120 of the SSD 102 includes the first data 700, the second data 702, the third data 704, the fourth data 706 and the fifth data 708.

State 2 of FIG. 8 illustrates a state after the first data 700, the second data 702 and the third data 704 from the SSD 102 have been transmitted to the host 104. The first data 700, the second data 702 and the third data 704 are now stored in the buffer 190 of the host 104. Once the host 104 has confirmed that the first data 700, the second data 702 and the third data 704 have been received by the host 104, the first data 700, the second data 702 and the third data 704 stored in the buffer 120 of the SSD 102 may be deleted from the buffer 120 or the address storing the first data 700, the second data 702 and the third data 704 may be freed up to store other data.

State 3 of FIG. 8 illustrates a state after a deadlock has been detected between the SSD 102 and the host 104. The deadlock can be detected by either the SSD 102 or the host 104, as described above in FIGS. 5 and 6. A recovery command (e.g., 542, 642) may have been transmitted (by either the SSD 102 or the host 104). State 3 illustrates that the buffer has been cleared and data that has not been transmitted to the host 104 is no longer present in the buffer 120. This may occur because resetting the communication link with the host 104 may reset the buffer 120. On the host 104 side, state 3 illustrates that the first data 700, the second data 702 and the third data 704 are still in the buffer 190 while in deadlock and/or recovering from deadlock. However, in some implementations, the first data 700, the second data 702 and the third data 704 may be freed up from the buffer 190 as the processor of the host 104 processes the first data 700, the second data 702 and the third data 704, even while the host 104 is in deadlock or recovering from deadlock.

State 4 of FIG. 8 illustrates a state after the fourth data 706 and the fifth data 708 have been re-loaded in the buffer 120 of the SSD 102.

State 5 of FIG. 8 illustrates a state after the fourth data 706 from the SSD 102 has been transmitted to the host 104. Once the host 104 has confirmed that the fourth data 706 has been received by the host 104, the fourth data 706 stored in the buffer 120 of the SSD 102 may be deleted from the buffer 120 or the address storing the fourth data 706 may be freed up to store other data.

Figure 9:
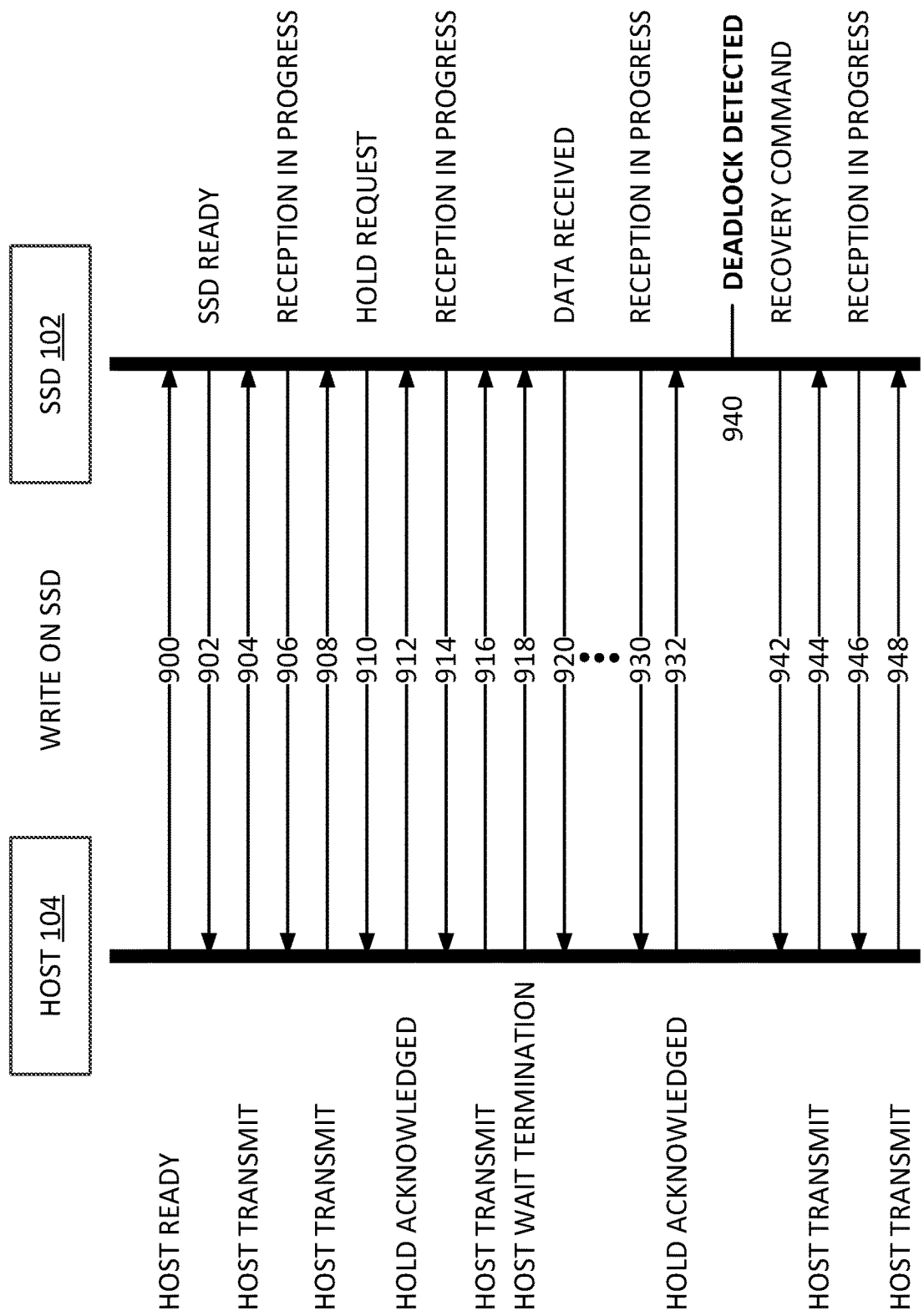
FIG. 9 illustrates an exemplary flow diagram of a method for resolving a deadlock by a SSD during a write operation.

Exemplary Flow Sequence of a Solid State Device (Ssd) Recovering from a Deadlock During a Write Operation on the Ssd FIG. 9 illustrates an exemplary flow sequence diagram for resolving or recovering from a deadlock by an SSD. The flow sequence of FIG. 9 may represent a sequence that includes a write operation request from the host 104, to the SSD 102. FIG. 9 will be described from the perspective of the SSD 102.

The SSD 102 may receive a command 900 indicating that the host 104 is ready to transmit data (e.g., FIS) to the SSD 102. The SSD 102 104 may transmit a command 902 indicating the SSD 102 is ready to receive data (e.g., FIS) from the host 104, in response to the command 900. The SSD 102 may receive a first data (e.g., first FIS) 904 from the host 104, in response to the command 902. The SSD 102 may transmit a response 906 that the first data 904 is in progress of being received. The SSD 102 may receive a second data (e.g., second FIS) 908 from the host 104. The SSD 102 may transmit a response 910 to hold off any further transmission of data. The SSD 102 may receive a response 912 acknowledging the hold request. The SSD 102 may transmit a command 914 to resume transmitting data. The SSD 102 may receive a third data (e.g., third FIS) 916 from the host 104. The SSD 102 may receive a command 918 indicating that a first frame (which may include the first data, the second data and the third data) has been transmitted and is waiting for frame termination confirmation. The SSD 102 may transmit a response 920 indicating that the frame (e.g., first data, second data and/or third data) has been received by the SSD 102. In some implementations, the above sequence may be repeated several times for each respective frame that is transmitted. However, the sequence of the commands and responses may vary frame by frame. For example, the number of commands and the number of responses may vary for different frames.

FIG. 9 further illustrates the SSD 102 transmitting a command 930 to resume transmission of data (e.g., FIS). The SSD 102 may receive a command 932 acknowledging a hold request, which may not be the proper response by the SSD 102. In some implementations, the SSD 102 detects (at 940) that a deadlock has occurred or is in progress. There are various ways for the SSD 102 to detect or determine that a deadlock has occurred and/or is in progress. In one example, the SSD102 may use a timer or clock to keep track of when the last time data has been transmitted and/or received by the SSD 102. The timer or clock resets every time data has been transmitted and/or received. Whenever the timer is equal or above a certain value, the SSD 102 determines that a deadlock has occurred between the SSD 102 and the host 104. In some implementations, the timer is a countdown clock, and a deadlock is determined to have occurred or is in progress when the clock reaches zero or another threshold value. Another way to determine whether a deadlock has occurred may be to look at how full the buffer 120 is. When the buffer 120 is full, near capacity and/or equal or above a certain threshold value, the SSD 102 may make a determination that a deadlock has occurred, since a buffer 120 that is not clearing may mean that data in the buffer is not being transmitted. The determination of the deadlock may be made by the processor 106 of the SSD 102. In some implementations, the processor 106 may keep track of the timer or clock, and/or the capacity of the buffer 120.

In some implementations, determining that a deadlock has occurred may be enough for the SSD 102 to recover from the deadlock. In some instances, the deadlock between the SSD 102 and the host 104 may originate at the link layer of the communication link. In some implementations, transmitting a recovery command 942 to the host 104 may be get the SSD 102 out of deadlock. The recovery command 942 includes a unique command to let the host 104 know that a deadlock has occurred. In some implementations, the recovery command 942 is enough to get the communication link between the SSD 102 and the host 104 out of a deadlock state or a deadlock loop. Different implementations may use different variations of the recovery command 942. The recovery command 942 may include data, commands, and/or responses. In some implementations, the recovery command 942 may include a FIS (e.g., VU FIS).

In some implementations, when the host 104 receives the recovery command 942, the host 104 may recover from the deadlock. The SSD 102 may receive data 944 (e.g., FIS) from the host 104. The SSD 102 may transmit a command 946 indicating that the data is in progress of being received. The SSD 102 may receive data 948 from the host 104. The SSD 102 may continue to transmit and receive commands, responses and/or data as described above for FIG. 9. Primitives and frames are examples of code, commands, responses that may be transmitted between the SSD 102 and the host 104.

Figure 10:
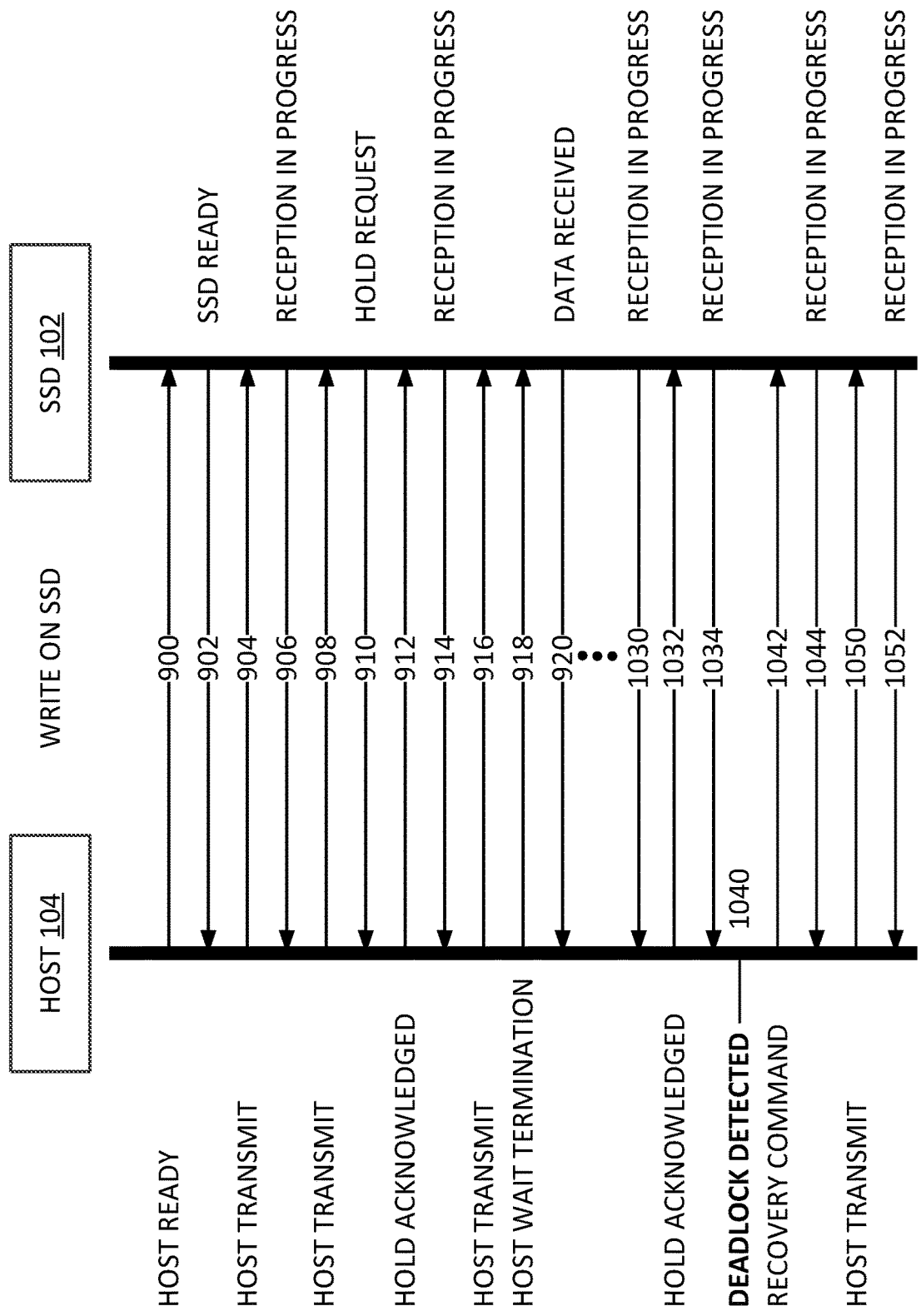
FIG. 10 illustrates an exemplary flow diagram of a method for resolving a deadlock by a host during a write operation.

FIG. 10 illustrates an exemplary flow sequence diagram for resolving a deadlock by a host. The flow sequence of FIG. 10 may represent a sequence that includes a write operation request from the host 104, to the SSD 102. FIG. 10 will be described from the perspective of the host 104. FIG. 10 is similar to FIG. 9, but shows that the deadlock detection is made by the host 104. The commands and responses 900 through 920 of FIG. 10 are similar to the commands and responses 900 through 920 of FIG. 9.

FIG. 10 illustrates the host 104 receiving a command 1030 to resume transmission of data (e.g., FIS). The host 104 may transmit a command 1032 requesting a hold request, which may or may not be the proper response to the SSD 102. The host 104 receives a command 1034 to resume transmission of data, which also may or may not be a proper response from the SSD 102.

The host 104 detects (at 1040) that a deadlock has occurred or is in progress. There are various ways for the host 104 to detect or determine that a deadlock has occurred and/or is in progress. In one example, the host 104 may use a timer or clock to keep track of when the last time data has been transmitted and/or received by the host 104. The timer or clock resets every time data has been transmitted and/or received (e.g., successfully transmitted and/or received). Whenever the timer is equal or above a certain value, the host 104 determines that a deadlock has occurred between the SSD 102 and the host 104. In some implementations, the timer is a countdown clock, and a deadlock is determined to have occurred or is in progress when the clock reaches zero or another threshold value. Another way to determine whether a deadlock has occurred may be to look at how full the buffer 190 is. When the buffer 190 is full, near capacity and/or equal or above a certain threshold value, the host 104 may make a determination that a deadlock has occurred, since a buffer 190 that is not clearing may mean that data in the buffer is not being transmitted. The determination of the deadlock may be made by the processor 170 of the host 104. In some implementations, the processor 170 may keep track of the timer or clock, and/or the capacity of the buffer 190.

In some implementations, determining that a deadlock has occurred may be enough for the host 104 to recover from the deadlock. In some instances, the deadlock between the SSD 102 and the host 104 may originate at the link layer of the communication link. In some implementations, transmitting a recovery command 1042 to the SSD 102 may get the host 104 out of deadlock. The recovery command 1042 includes a unique command to let the SSD 102 know that a deadlock has occurred. In some implementations, the recovery command 1042 is enough to get the communication link between the SSD 102 and the host 104 out of deadlock state or deadlock loop. Different implementations may use different variations of the recovery command 1042. The recovery command 1042 may include data, commands, and/or responses. In some implementations, the recovery command 1042 may include a FIS (e.g., VU FIS).

In some implementations, when the host 104 transmits the recovery command 1042, the host 104 may recover from the deadlock. The host 104 may receive a command 1044 to resume transmission of data (e.g., FIS). The host 104 may transmit data 1050 to the SSD 102. The host 104 may receive a response 1052 from the SSD 102 that data is in progress of being received.

Figure 11:
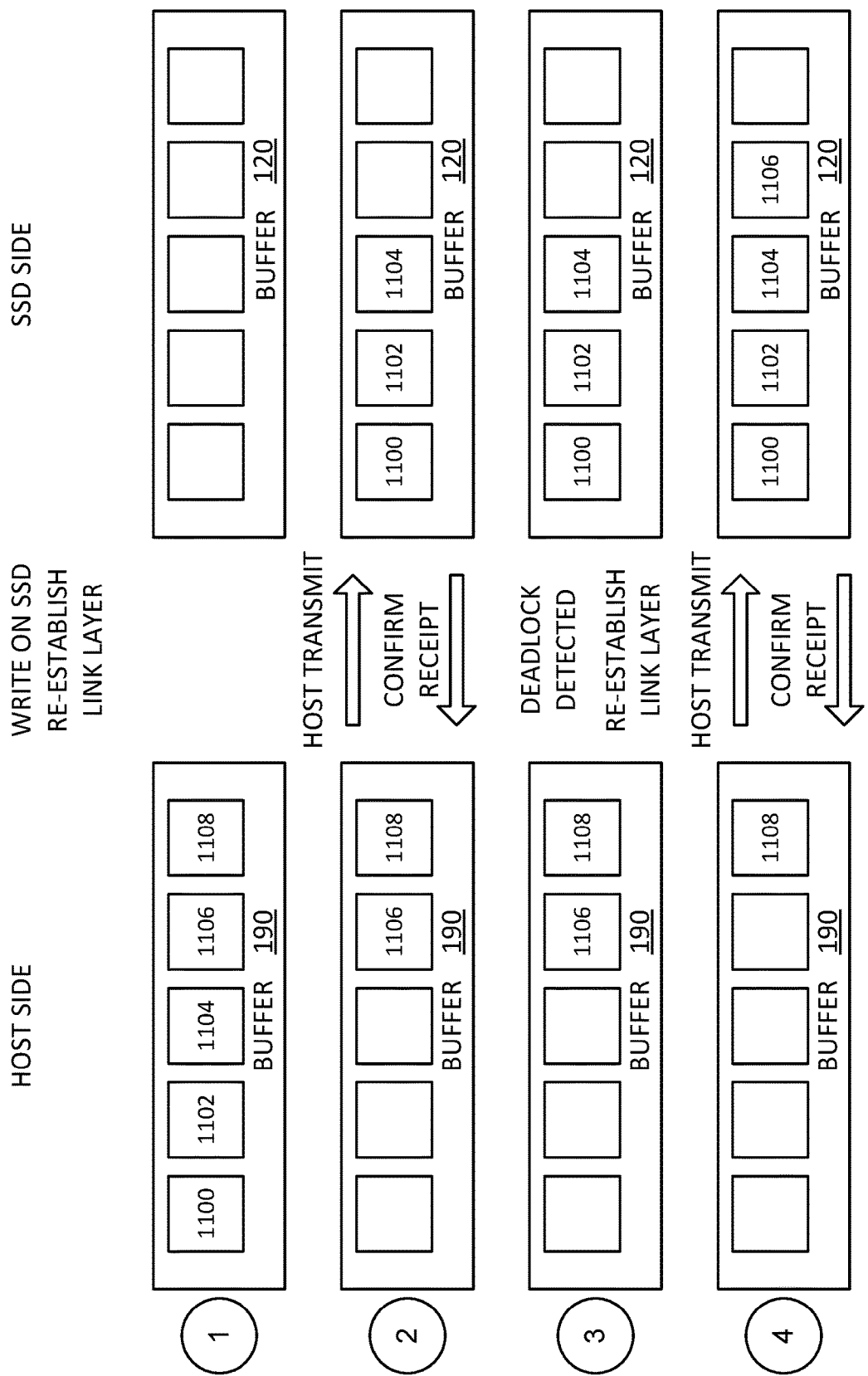
FIG. 11 illustrates an exemplary flow diagram of a sequence for resolving a deadlock by a SSD during a write operation.

FIG. 11 illustrates an exemplary flow sequence diagram for resolving or recovering from a deadlock. The flow sequence of FIG. 11 may represent a sequence that includes a write operation request from the host 104, to the SSD 102.

State 1 of FIG. 11 illustrates a state where the buffer 120 of the SSD 102 is empty and the buffer 190 of the host 104 includes a first data 1100, a second data 1102, a third data 1104, a fourth data 1106 and a fifth data 1108.

State 2 of FIG. 11 illustrates a state after the first data 1100, the second data 1102 and the third data 1104 from the host 104 have been transmitted to the SSD 102. The first data 1100, the second data 1102 and the third data 1104 are now stored in the buffer 120 of the SSD 102. It is noted that in some implementations, the first data 1100, the second data 1102 and the third data 1104 may bypass the buffer 120 and be transmitted to the processor of the SSD 102. Once the SSD 102 has confirmed that the first data 1100, the second data 1102 and the third data 1104 have been received by the SSD 102, the first data 1100, the second data 1102 and the third data 1104 stored in the buffer 190 of the host 104 may be deleted from the buffer 190 or the address storing the first data 1100, the second data 1102 and the third data 1104 may be freed up to store other data. In this case, state 2 illustrates that the first data 1100, the second data 1102 and the third data 1104 have been deleted.

State 3 of FIG. 11 illustrates a state after a deadlock has been detected between the SSD 102 and the host 104. The deadlock can be detected by either the SSD 102 or the host 104, as described above in FIGS. 9 and 10. A recovery command (e.g., 942, 1042) has been transmitted (by either the SSD 102 or the host 104). State 3 illustrates that data that has not been transmitted to the SSD 102 is still present in the buffer 190 and has not been lost. In some implementations, additional data may be stored in the buffer 190 while there is deadlock and/or while recovering from deadlock. On the SSD 102 side, state 3 illustrates that the first data 1100, the second data 1102 and the third data 1104 are still in the buffer 120 while in deadlock and/or recovering from deadlock. However, in some implementations, the first data 1100, the second data 1102 and the third data 1104 may be freed up from the buffer 120 as the processor of the SSD 102 processes the first data 1100, the second data 1102 and the third data 1104, even while the SSD 102 is in deadlock or recovering from deadlock.

State 4 of FIG. 11 illustrates a state after the fourth data 1106 from the host 104 has been transmitted to the SSD 102. Once the SSD 102 has confirmed that the fourth data 1106 has been received by the SSD 102, the fourth data 1106 stored in the buffer 190 of the host 104 may be deleted from the buffer 190 or the address storing the fourth data 1106 may be freed up to store other data.

The above approach for a deadlock recovery provides a solution that preserves data that is already stored in the buffer, which reduces latency (for not having to reload data in the buffer) and reduces errors in the data that is transmitted. In contrast, a hard reset of the host 104 does not preserve data in the buffer and has a very high impact on command latency. As mentioned above, a hard reset may also result in current commands and/or active commands to be lost.

Figure 12:
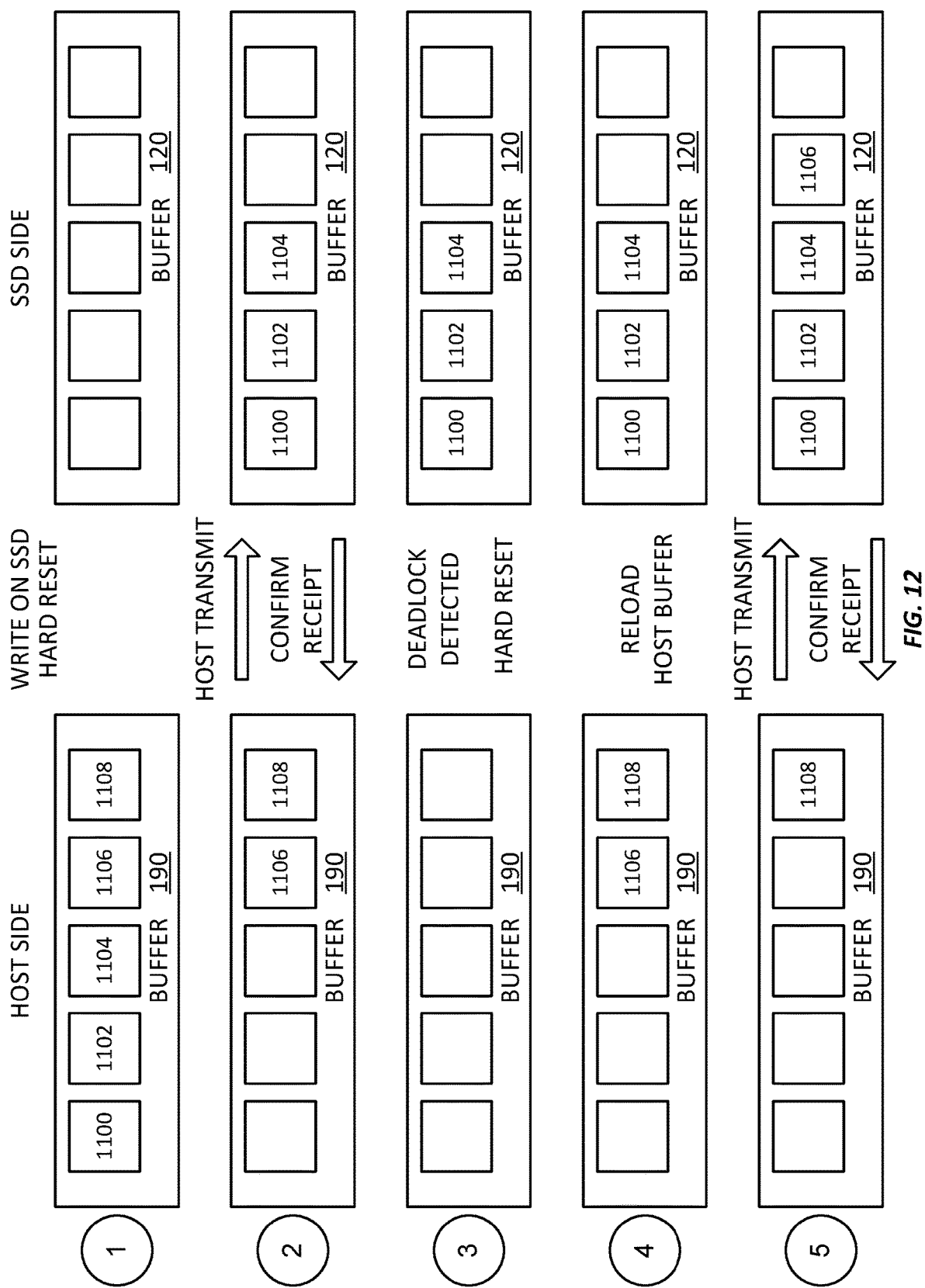
FIG. 12 illustrates an exemplary flow diagram of a sequence for resolving a deadlock by a host during a write operation.

FIG. 12 illustrates an exemplary flow sequence diagram for resolving or recovering from a deadlock. The flow sequence of FIG. 12 may represent a sequence that includes a write operation request from the host 104, to the SSD 102. FIG. 12 illustrates a process that recovers from deadlock and also clear the buffers.

State 1 of FIG. 12 illustrates a state where the buffer 120 of the SSD 102 is empty and the buffer 190 of the host 104 includes the first data 1100, the second data 1102, the third data 1104, the fourth data 1106 and the fifth data 1108.

State 2 of FIG. 12 illustrates a state after the first data 1100, the second data 1102 and the third data 1104 from the host 104 have been transmitted to the SSD 102. The first data 1100, the second data 1102 and the third data 1104 are now stored in the buffer 120 of the SSD 102. Once the SSD 102 has confirmed that the first data 1100, the second data 1102 and the third data 1104 have been received by the SSD 102, the first data 1100, the second data 1102 and the third data 1104 stored in the buffer 190 of the host 104 may be deleted from the buffer 190 or the address storing the first data 1100, the second data 1102 and the third data 1104 may be freed up to store other data.

State 3 of FIG. 12 illustrates a state after a deadlock has been detected between the SSD 102 and the host 104. The deadlock can be detected by either the SSD 102 or the host 104, as described above in FIGS. 9 and 10. A recovery command (e.g., 1042, 1042) may have been transmitted (by either the SSD 102 or the host 104). State 3 illustrates that the buffer has been cleared and data that has not been transmitted to the SSD 102 is no longer present in the buffer 190. This may occur because resetting the communication link with the host 104 may reset the buffer 190. On the SSD 102 side, state 3 illustrates that the first data 1100, the second data 1102 and the third data 1104 are still in the buffer 120 while in deadlock and/or recovering from deadlock. However, in some implementations, the first data 1100, the second data 1102 and the third data 1104 may be freed up from the buffer 120 as the processor of the SSD 102 processes the first data 1100, the second data 1102 and the third data 1104, even while the host 104 is in deadlock or recovering from deadlock.

State 4 of FIG. 12 illustrates a state after the fourth data 1106 and the fifth data 1108 has been re-loaded in the buffer 190 of the host 104.

State 5 of FIG. 12 illustrates a state after the fourth data 1106 from the host 104 has been transmitted to the SSD 102. Once the SSD 102 has confirmed that the fourth data 1106 has been received by the SSD 102, the fourth data 1106 stored in the buffer 190 of the host 104 may be deleted from the buffer 190 or the address storing the fourth data 1106 may be freed up to store other data.

Exemplary Flow Charts of Methods for Recovering from a Deadlock

Figure 13:
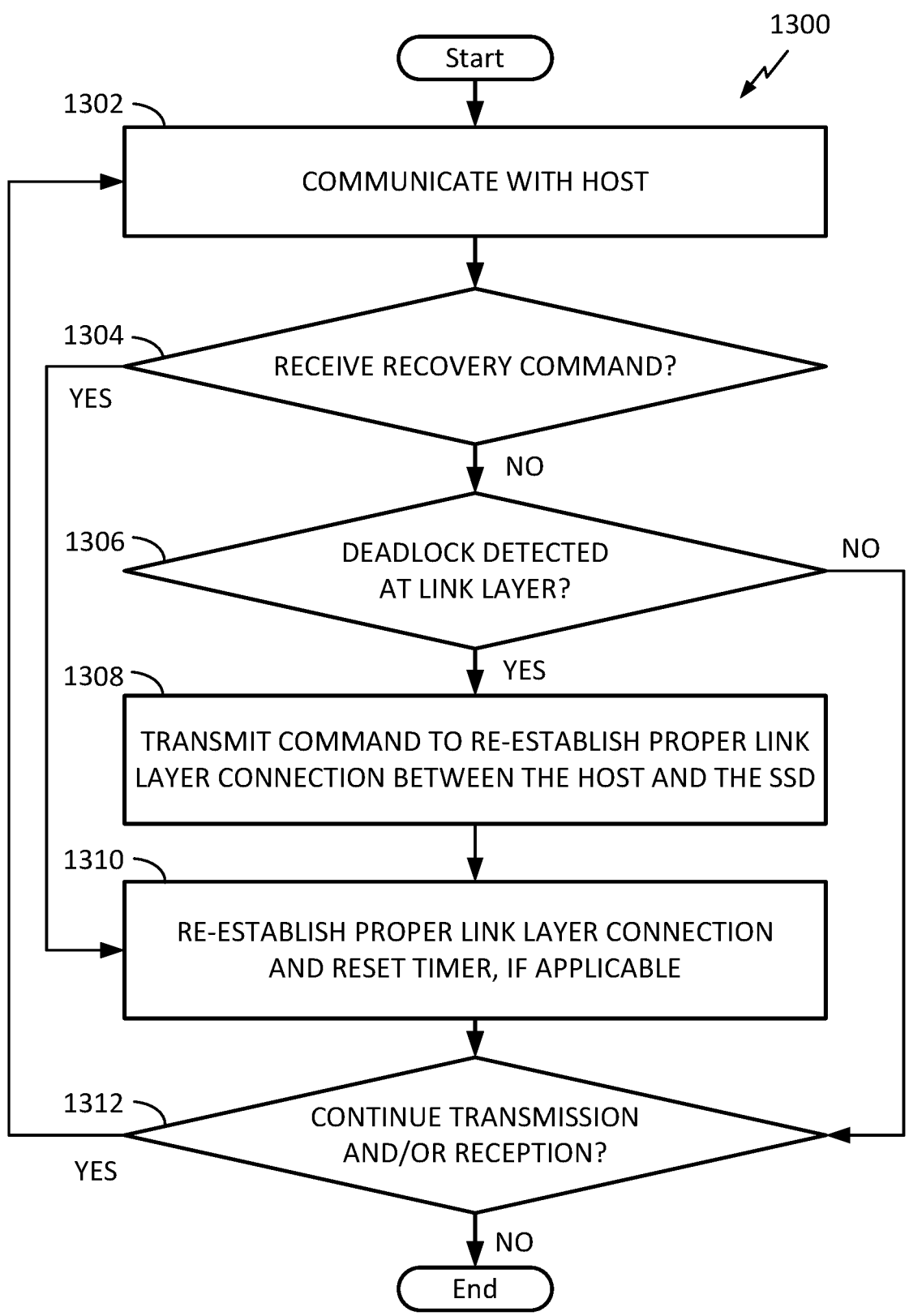
FIG. 13 illustrates a flow diagram of a method, by a solid state device (SSD), for resolving a deadlock in accordance with embodiments of the present disclosure.

FIG. 13 illustrates a flow chart of a method 1300 for recovering from a deadlock. The method shown in FIG. 13 may be performed by any of the SSDs described in the present disclosure, such as the SSD 102. Also, for purpose of clarity, the method shown in FIG. 13 does not necessarily show all the operations performed by the SSD. In some implementations, the method shown in FIG. 13 may include other operations that can be performed by the SSD. In some implementations, the order of the methods may be changed or rearranged. The method 1300 may be performed by a processor of the SSD, as described above.

The method communicates (at 1302) with a host (e.g., 104). Communication with the host can include commands, responses, and/or data. Examples of communications with the host are illustrated and described in FIGS. 5, 6, 9 and 10.

The method determines (at 1304) whether a recovery command has been received from the host. A recovery command may include data, such as FIS (e.g., VU FIS), as described above. A recovery command may be received when the host has determined that a deadlock has occurred or is in progress. When a recovery command has been received, the method re-establishes (at 1310) a proper link layer connection with the host and resets a timer that keeps track of when the last time data has been received or transmitted by the SSD (e.g., 102). In some implementations, re-establishing a proper link layer connection may involve receiving the recovery command and providing a proper response to the command or response that was received prior to receiving the recovery command. For example, when the command that is received prior to the recovery command, is a host ready to receive data, resume transmitting of data, or data reception in progress, the method may transmit data (e.g., FIS) after receiving the recovery command. The data that is transmitted may be data from a buffer. In another example, when the command that is received prior to the recovery command, is a hold request then the method may transmit a hold acknowledgment to the host. However, different implementations may transmit different commands, responses, and/or data in response to receiving the recovery command. In some implementations, the recovery command is ignored, but receiving the recovery command is enough to get the SSD out of a deadlock.

When the method determines (at 1304) that no recovery command has been received, the method determines (at 1306) whether a deadlock has occurred (e.g., since the last deadlock) or is in progress. Different implementations may use different criteria to determine or detect whether a deadlock has occurred. In some implementations, detecting a deadlock include detecting whether a deadlock has occurred or in in progress at the link layer. In some implementations, determining whether there is a deadlock may include using a timer to determine how long it has been since data has been transmitted and/or received. For example, when the timer value is equal or above a certain threshold value, the method may determine (at 1306) that a deadlock has occurred or is in progress. In some implementations, the timer is a countdown clock, and a deadlock is determined to have occurred or is in progress when the clock reaches zero or another threshold value. Another method to determine whether a deadlock has occurred or is in progress may include looking at how full the buffer, which may be an indication that data is not being transmitted. In some implementations, the method may determine that a deadlock has occurred when the buffer utilization rate is equal or above a certain value.

When the method determines (at 1306) that no deadlock has occurred or no deadlock is in progress, the method determines (at 1312) whether to continue transmitting and/or receiving data from the host. When the method determines (at 1312) to continue transmitting and/or receiving data, the method proceeds back to 1302 to communicate with the host.

When the method determines (at 1306) that a deadlock has occurred (e.g., since the last deadlock) or is in progress, the method transmits (at 1308) a recovery command. A recovery command may include data, such as FIS (e.g., VU FIS), as described above. The recovery command may help re-establish a proper link layer connection between the host 104 and the SSD 102. The method then re-establishes (at 1310) a proper link layer connection with the host 104 and resets a timer that keeps track of when the last time data has been received or transmitted by the SSD 102.

In some implementations, several iterations of the method 1300 may be performed by the SSD. While the method may reset (at 1310) the timer, the method may not reset a timer in some implementations.

Figure 14:
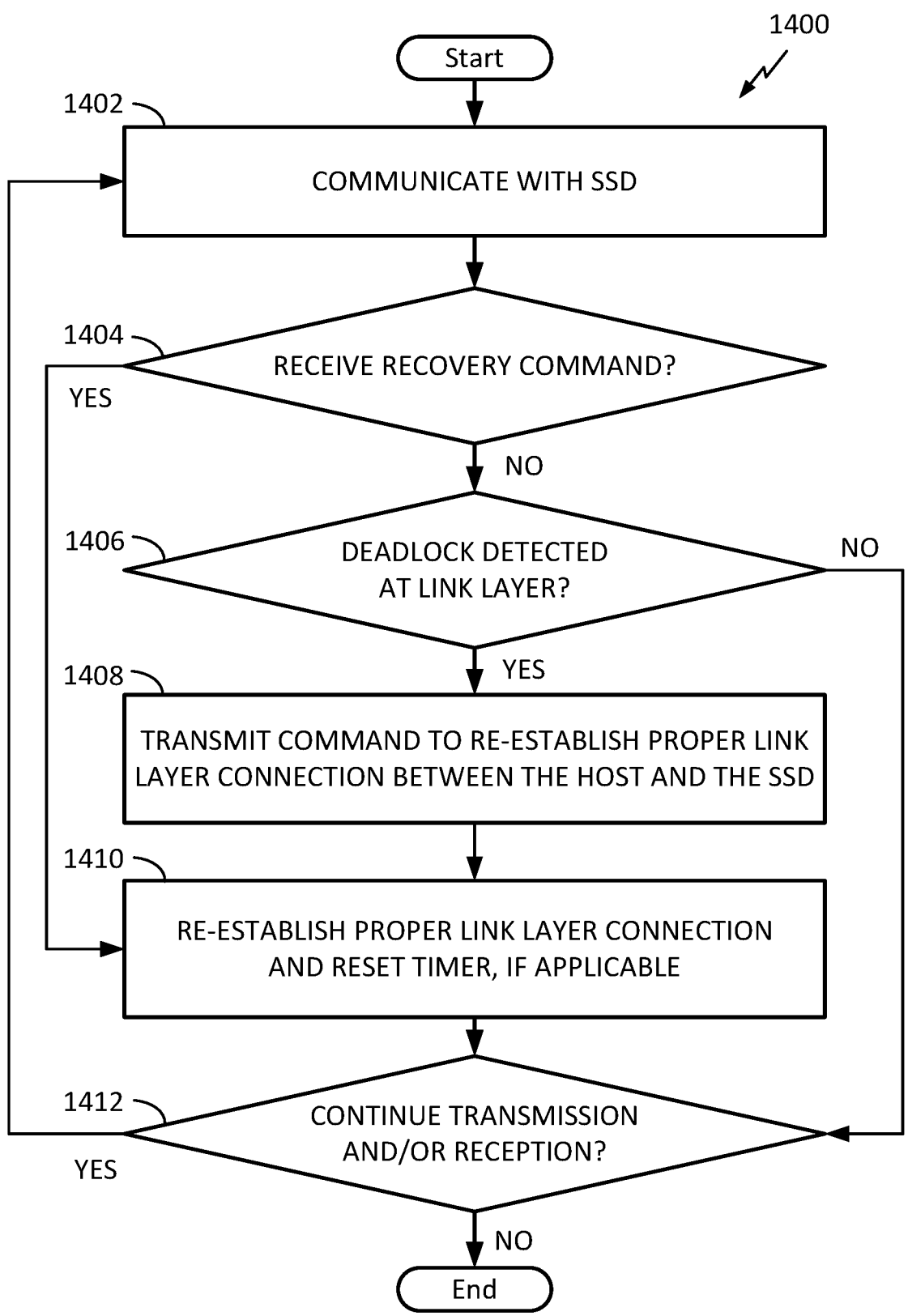
FIG. 14 illustrates a flow diagram of a method, by a host, for resolving a deadlock in accordance with embodiments of the present disclosure.

FIG. 14 illustrates a flow chart of a method 1400 for recovering from a deadlock. The method shown in FIG. 14 may be performed by a host (e.g., 104). Also, for purpose of clarity, the method shown in FIG. 14 does not necessarily show all the operations performed by the host. In some implementations, the method shown in FIG. 14 may include other operations that can be performed by the host. In some implementations, the order of the methods may be changed or be rearranged. The method 1400 may be performed by a processor of the host, as described above.

The method communicates (at 1402) with an SSD (e.g., 102). Communications with the SSD can include commands, responses, and/or data. Examples of communications with the SSD are illustrated and described in FIGS. 5, 6, 9 and 10.

The method determines (at 1404) whether a recovery command has been received from the SSD. A recovery command may include data, such as FIS (e.g., VU FIS), as described above. A recovery command may be received when the SSD has determined that a deadlock has occurred or is in progress. When a recovery command has been received, the method re-establishes (at 1410) a proper link layer connection with the SSD and resets a timer that keeps track of when the last time data has been received or transmitted by the host (e.g., 104). In some implementations, re-establishing a proper link layer connection may involve receiving the recovery command and providing a proper response to the command or response that was received prior to receiving the recovery command. For example, when the command that is received prior to the recovery command, is an SSD ready to receive data, resume transmitting of data, or data reception in progress, the method may transmit data (e.g., FIS) after receiving the recovery command. The data that is transmitted may be data from a buffer. In another example, when the command that is received prior to the recovery command, is a hold request then the method may transmit a hold acknowledgment to the SSD. However, different implementations may transmit different commands, responses, and/or data in response to receiving the recovery command. In some implementations, the recovery command is ignored, but receiving the recovery command is enough to get the host out of a deadlock.

When the method determines (at 1404) that no recovery command has been received, the method determines (at 1406) whether a deadlock has occurred (e.g., since the last deadlock) or is in progress. Different implementations may use different criteria to determine or detect whether a deadlock has occurred. In some implementations, detecting a deadlock include detecting whether a deadlock has occurred or in in progress at the link layer. In some implementations, determining whether there is a deadlock may include using a timer to determine how long it has been since data has been transmitted and/or received. When the timer value is equal or above a certain threshold value, the method may determine (at 1406) that a deadlock has occurred or is in progress. In some implementations, the timer is a countdown clock, and a deadlock is determined to have occurred or is in progress when the clock reaches zero or a particular threshold value. Another method to determine whether a deadlock has occurred or is in progress may include looking at how full the buffer is, which may be an indication that data is not being transmitted. In some implementations, the method may determine that a deadlock has occurred when the buffer utilization rate is equal or above a certain value.

When the method determines (at 1406) that no deadlock has occurred or no deadlock is in progress, the method determines (at 1412) whether to continue transmitting and/or receiving data from the SSD. When the method determines (at 1412) to continue transmitting and/or receiving data, the method proceeds back to 1402 to communicate with the SSD.

When the method determines (at 1406) that a deadlock has occurred (e.g., since the last deadlock) or is in progress, the method transmits (at 1408) a recovery command. A recovery command may include data, such as FIS (e.g., VU FIS), as described above. The recovery command may help re-establish a proper link layer connection between the host and the SSD. The method then re-establishes (at 1410) a proper link layer connection with the SSD and resets a timer that keeps track of when the last time data has been received or transmitted by the host.

In some implementations, several iterations of the method 1400 may be performed by the host. While the method may reset (at 1410) the timer, the method may not reset a timer in some implementations.

Exemplary Flow Sequence of Recovering from a Deadlock

Figure 15:
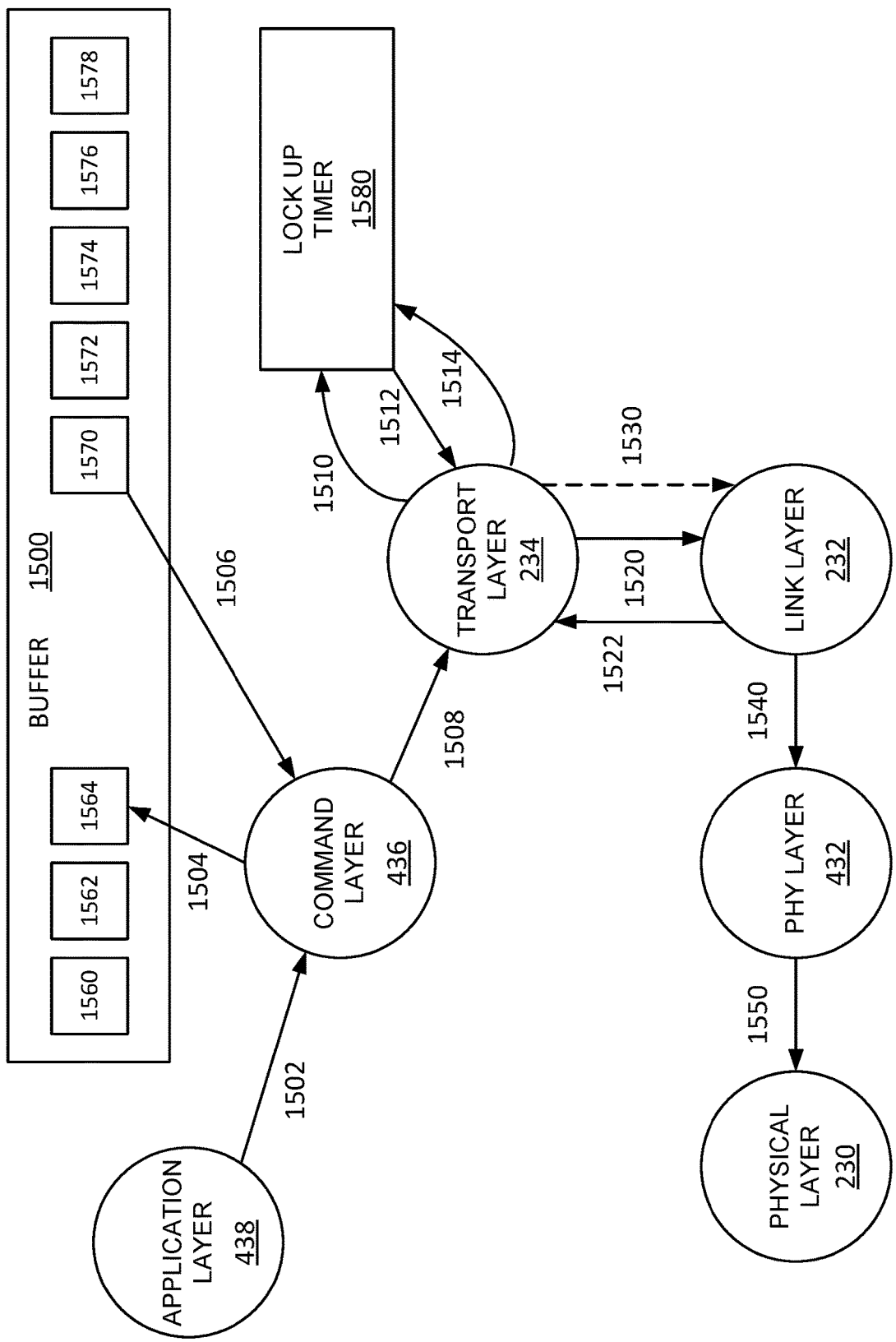
FIG. 15 illustrates a flow diagram of a method for resolving a deadlock in communication link by using several protocol layers in accordance with embodiments of the present disclosure.

FIG. 15 illustrates an exemplary flow diagram of a sequence for resolving or recovering from a deadlock. The method flow sequence may be performed by an SSD or a host coupled to an SSD. The flow sequence of FIG. 15 may represent a sequence that includes a read operation request from the host 104, to the SSD 102; or a write operation request from the host 104, to the SSD 102. FIG. 15 will be described from the perspective of the SSD 102, but may be applicable to the host 104 as well. It is noted that the some of the protocol layers below are logical layers that are implemented by a processor of the SSD and/or a processor of the host. Thus, it should be understood that in some instances, when a particular protocol layer is performing an operation, as described in the present disclosure, it may mean that one or more processors may be performing or implementing the operation by using the particular protocol. For example, when a transport layer is performing an operation, that may mean that a processor may perform that operation by using the transport layer.

The application layer 438 initiates (at 1502) data that is ready to be transmitted to the command layer 436. The command layer 436 checks (at 1504) in the buffer 1500 which data has already been transmitted, and which data (e.g., FIS) from the buffer can be transmitted. In this example, the data 1560, data 1562 and data 1564 have already been transmitted, and the addresses in the buffer of the data 1560, 1562 and 1564 are freed up to be used by other data. The command layer 436 processes (at 1506) data from the buffer 1500, such as data 1570, 1572, 1574, 1576 and 1578. Data 1570-1578 are in the process of being transmitted (e.g., from the SSD to the host).

The command layer 436 instructs (at 1508) the transport layer 234 to transmit the data 1570-1578 to the host. The data 1570-1578 may be transmitted sequentially or in another order. Once the transmitting starts, the transport layer 234 may instruct a lock up timer 1580 to start (at 1510) a timer that keeps track of when the last transmission of data has occurred. When the timer value is equal or greater than a threshold value, or the timer is a countdown clock and has reached zero or another threshold value (e.g., whether time has expired), the lock up timer 1580 may instruct (at 1512) the transport layer 234 to initiate a recovery of the deadlock. Once data is sent and/or the transmission is complete, the transport layer 234 may instruct (at 1514) the lock up timer 1580 to reset or stop the timer.

The transport layer 234 may construct (at 1520) the data structure (e.g., FIS) based on the data provided by the application layer 438 and notifies the link layer 232 to transfer or transmit the data structure. The link layer 232 then provides (at 1522) a result of the transmission back to the transport layer 234.

In some implementations, a deadlock is detected, and the transport layer 234 may construct (at 1530) a recovery command (e.g., VU FIS) and send it to the link layer 232 so that the link layer 232 can come out of the deadlock. This may allow the processing of the data and the transmission of the data to continue.

The link layer 232 may prepare (at 1540) the proper commands and data to be used by the PHY layer 432. The PHY layer 423 then sends the data through the physical layer 230. Commands, responses and/or data (e.g., FIS) may be received back through the physical layer 230, the PHY layer 432, the link layer 232, the transport layer 234, the command layer 436 and the application layer 438.

When the above sequence is performed by the host 104, the operations described above may be performed by the corresponding protocol layers of the host 104. For example, the operation of the application layer 438 may be performed by the application layer 468 of the host 104, the operation of the command layer 436 may be performed by the command layer 466 of the host 104, the operation of the transport layer 234 may be performed by the transport layer 264 of the host 104, the operation of the link layer 232 may be performed by the application layer 262 of the host 104, the operation of the PHY layer 432 may be performed by the PHY layer 462 of the host 104, and the operation of the physical layer 230 may be performed by the physical layer 260 of the host 104.

Some of the above protocol layers may be logical layers that are used by the processor of the SSD and/or the processor of the host, to perform one or more operations.

In some implementations, it is noted that when a particular recovery command is received by the SSD 102 or the host 104, the particular recovery command may be processed by the SSD 102 or the host 104 up to the link layer or up to the transport layer. That is, in some implementations, the SSD 102 and/or the host 104 may not do any additional processing beyond the transport layer.

Figure 16:
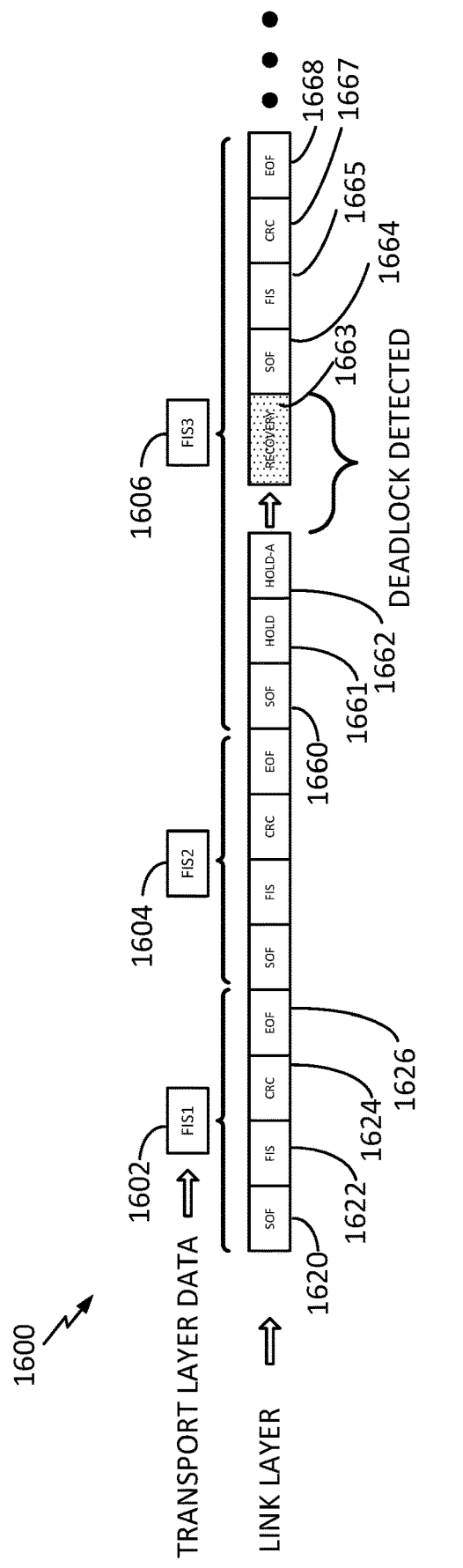
FIG. 16 illustrates a block diagram of data packets at the link layer level being transmitted between a host and a solid state device (SSD) in accordance with embodiments of the present disclosure.

FIG. 16 illustrates a block diagram of exemplary packets at the link layer being transmitted between a host and a SSD in accordance with embodiments of the present disclosure. In some implementations, the sequence illustrated in FIG. 16 is an exemplary sequence of a plurality of packets 1600. The sequence illustrated in FIG. 16 may be a transmission sequence or a reception sequence. The plurality of packets 1600 may include a first packet 1602, a second packet 1604 and a third packet 1606. One or more of the packets may include a Frame Information Structure (FIS). The packets 1602, 1604, 1606 may be exemplary implementations of the data structure 300 of FIG. 3. The packets 1602, 1604, and 1606 may be data that is specified to be acted on by a transport layer. The packets 1602, 1604 and 1606 may be packets at the link layer.

The first packet 1602 includes a first start of frame 1620, a first data payload 1622, a first error correction control 1624, and a first end of frame 1626. The second packet 1604 includes a second start of frame 1620, a second data payload 1622, a second error correction control 1624, and a second end of frame 1626. The third packet 1606 includes a third start of frame 1660, a first instruction 1661, a second instruction 1662, a recovery command 1663, a start of frame 1664, a third data payload 1665, a third error correction control 1667, and a third end of frame 1668.

FIG. 16 illustrates a deadlock being detected after the second instruction 1662. The recovery command 1663 may be transmitted or received after a deadlock has been detected. The recovery command 1663 may be code (e.g., recovery code) that is processed by the SSD 102 and/or the host 104. A recovery code may include primitives and/or frames. After the recovery command 1663 has been transmitted or received, the start frame 1664 is transmitted or received. The start frame 1664 may be the same as the third start frame 1660.

FIG. 16 illustrates an exemplary sequence of data, code, commands, responses, and/or instructions that may transmitted or received by a host or a SSD. Different implementations may transmit and/or receive a different sequence of data, code, commands, responses, and/or instructions.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A data storage apparatus comprising:
a non-volatile memory (NVM); and
a controller coupled to the NVM, the controller comprising:
a memory;
a processor coupled to the memory, the processor configured to:
determine whether there is a deadlock in a communication link between the data storage apparatus and a host; and
transmit, when there is a deadlock in the communication link between the data storage apparatus and the host, a recovery command to the host to re-establish a link layer connection between the data storage apparatus and the host, wherein the recovery command is constructed using a transport layer of the communication link.

2. The data storage apparatus of claim 1, wherein determining whether there is a deadlock in the communication link between the data storage apparatus and the host includes using a timer to determine whether time has expired.

3. The data storage apparatus of claim 1, wherein determining whether there is a deadlock in the communication link between the data storage apparatus and the host includes using a timer to determine whether a timer value is equal or greater than a threshold value.

4. The data storage apparatus of claim 1, wherein determining whether there is a deadlock in the communication link between the data storage apparatus and the host includes determining whether there is a deadlock at the link layer of the communication link.

5. The data storage apparatus of claim 1, wherein the recovery command includes a Frame Information Structure (FIS).

6. The data storage apparatus of claim 1, wherein the communication link between the data storage apparatus and the host, uses an application layer, a command layer, the transport layer, the link layer, a PHY layer and a physical layer.

7. The data storage apparatus of claim 1, wherein the controller further includes a buffer coupled to the processor.

8. The data storage apparatus of claim 7, wherein during an operation of the data storage apparatus, the buffer includes a plurality of data to be transmitted to the host, the plurality of data is maintained in the buffer when the link layer connection is re-established between the data storage apparatus and the host.

9. The data storage apparatus of claim 1, wherein the processor is further configured to receive a particular recovery command from the host.

10. The data storage apparatus of claim 9, wherein the particular recovery command causes the data storage apparatus to re-establish a link layer connection with the host.

11. A method for operating a data storage apparatus, comprising:

determining whether there is a deadlock in a communication link between the data storage apparatus and a host; and transmitting, when there is a deadlock in the communication link between the data storage apparatus and the host, a recovery command to the host to re-establish a link layer connection between the data storage apparatus and the host, wherein the recovery command is constructed by a processor of the data storage apparatus using a transport layer of the communication link.

12. The method of claim 11, wherein the recovery command includes a Vendor Unique (VU) Frame Information Structure (FIS).

13. The method of claim 11, wherein the recovery command is an indication that the data storage apparatus has detected a deadlock in the communication link between the data storage apparatus and the host.

14. The method of claim 11, further comprising transmitting a command in response to a prior command that was received prior to receiving the recovery command.

15. The method of claim 11, wherein receiving the recovery command includes processing the recovery command up to the link layer.

16. The method of claim 11, wherein receiving the recovery command includes processing the recovery command up to the transport layer.

17. An apparatus for operating a data storage device comprising:
   means for non-volatile storing of data; and
   means for controlling the means for non-volatile storing of data, comprising:
      means for storing data; and
      means for processing data coupled to the means for storing data, wherein the means for processing data is configured to:
         determine whether there is a deadlock at a link layer of a communication link between the data storage device and a host; and
         transmit to the host, when there is a deadlock in the communication link between the data storage device and the host, a recovery command to re-establish a link layer connection between the data storage device and the host; and
   a buffer coupled to the means for processing data,
      wherein the buffer is configured to store a plurality of data to be transmitted to the host, and
      wherein when a deadlock in the communication link between the data storage apparatus and the host has occurred and the link layer connection is re-established between the data storage device and the host, the buffer is configured to maintain storing data that has not been transmitted to the host.

18. The apparatus of claim 17, wherein determining whether there is a deadlock in the communication link between the data storage device and the host, includes using a countdown clock to determine whether time has expired.

19. The apparatus of claim 17, wherein determining whether there is a deadlock in the communication link between the data storage device and the host, includes using a timer to determine whether a timer value is equal or greater than a threshold value.

20. The apparatus of claim 17, wherein determining whether there is a deadlock in a communication link between the data storage device and the host, includes determining whether a buffer utilization rate of the buffer is equal or above a certain value.

* * * * *